(12) United States Patent
Kim et al.

(10) Patent No.: US 8,416,782 B2
(45) Date of Patent: Apr. 9, 2013

(54) METHOD OF EXCHANGING MESSAGES AND SOURCE DEVICES

(75) Inventors: Taek Soo Kim, Seoul (KR); Joong Heon Kim, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 12/797,044

(22) Filed: Jun. 9, 2010

(65) Prior Publication Data

US 2010/0313082 A1 Dec. 9, 2010

Related U.S. Application Data

(60) Provisional application No. 61/185,210, filed on Jun. 9, 2009.

(30) Foreign Application Priority Data

Dec. 18, 2009 (KR) .................. 10-2009-0126917

(51) Int. Cl.
 *H04L 12/56* (2006.01)
 *H04M 3/00* (2006.01)
(52) U.S. Cl.
 USPC ..................................... 370/392; 379/266.03
(58) Field of Classification Search .......... None
See application file for complete search history.

(56) References Cited

U.S. PATENT DOCUMENTS

| 2005/0044181 | A1* | 2/2005 | Lee ................................ 709/218 |
| 2008/0037540 | A1* | 2/2008 | Ngo et al. ...................... 370/392 |
| 2008/0129879 | A1* | 6/2008 | Shao et al. ..................... 348/723 |
| 2009/0059962 | A1* | 3/2009 | Schmidt et al. ................ 370/503 |
| 2009/0119427 | A1* | 5/2009 | Takahashi ...................... 710/106 |

FOREIGN PATENT DOCUMENTS

| KR | 10-2008-0020425 A | 3/2008 |
| WO | WO 2008/072910 A2 | 6/2008 |

OTHER PUBLICATIONS

PCT International Search Report dated Dec. 16, 2010 issued in Application No. PCT/KR2010/003684.
Rosenberg J. et al., "SIP: Session Initiation Protocol" Jun. 1, 2002, pp. 1-269.
European Search Report dated Oct. 24, 2012 for Application 10786358.1.

* cited by examiner

*Primary Examiner* — Clemence Han
(74) *Attorney, Agent, or Firm* — KED & Associates, LLP

(57) ABSTRACT

A method of exchanging messages, which are intended for streaming connection with a source device, in a sink device of a wireless network comprises transmitting a connect request message for data streaming to the source device; receiving a connect response message from the source device, the connect response message including connection information indicating the possibility of connection with the source device; and outputting a user interface indicating at least one of the connection information included in the connect response message and wait time information required for connection with the source device, on a display module.

13 Claims, 25 Drawing Sheets

FIG. 14

| Result Field(Bits:2) 820 | | Reason Field(Bits:6) 821 | |
|---|---|---|---|
| value | response type | value | reason code type |
| 0 | Success | 0 | Accepted |
| | | 1~63 | Reserved |
| 1 | Failure | 0 | Rejected |
| | | 1 | Timeout |
| | | 2 | Not associated |
| | | 3 | Invalid parameter |
| | | 4 | Insufficient resources |
| | | 5 | Handover in progress |
| | | 6 | Shutdown in progress |
| | | 7 | Busy |
| | | 8~62 | Reserved |
| | | 63 | Other reason |
| 2~3 | Reserved | | |

METHOD OF EXCHANGING MESSAGES AND SOURCE DEVICES

Pursuant to 35 U.S.C. §119(e), this application claims the benefit of priority to Provisional Application No. 61/185,210, filed on Jun. 9, 2009 and Korean patent application No. 10-2009-0126917 filed on Dec. 18, 2009, the contents of which are incorporated by reference herein in their entirety.

BACKGROUND OF THE INVENTION

1. Field of the Invention

The present invention relates to a wireless communication system, and more particularly, to a method of exchanging messages for data streaming connection management between devices.

2. Discussion of the Related Art

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

FIG. 1 is a brief diagram illustrating an example of a wireless private access network (WPAN).

As illustrated in FIG. 1, the WVAN is a network configured between personal devices within a limited space such as home, and allows information to be exchanged between applications without seamlessness by configuring a network through direct communication between devices. Referring to FIG. 1, the WPAN includes two or more user devices 11 to 15, one of which acts as a coordinator 11. The coordinator 11 provides basic timing of the WPAN and serves to control quality of service (QoS) requirements. Examples of the user devices include computers, PDAs, notebook computers, digital TVs, camcorders, digital cameras, printers, mikes, speakers, headsets, bar-code readers, displays, and cellular phones. All digital devices can be used as the user devices.

The WPAN is not predesigned but is an ad hoc network (hereinafter, referred to as 'piconet') formed if necessary without assistance of a central infrastructure. A procedure of forming one piconet will be described in detail. The piconet starts as a random device that can be operated as a coordinator performs the function of the coordinator. All devices perform scanning before associating with the existing piconet or starting a new piconet. Scanning means that a device collects and stores information of channels and searches whether the existing piconet exists. A device that has been commanded from an upper layer to start a piconet forms a new piconet without associating with a piconet previously formed on a random channel. The device starts a piconet by selecting a channel having little interference based on data acquired during scanning and broadcasting a beacon through the selected channel. In this case, the beacon means timing allocation information, information of other devices within a piconet, and control information broadcasted by the coordinator to control and manage the piconet.

FIG. 2 is a diagram illustrating an example of a superframe used in a piconet. Timing control in the piconet is basically performed based on superframes. Referring to FIG. 2, each superframe starts by means of the beacon transmitted from the coordinator. A contention access period (CAP) is used to allow devices to transmit commands or asynchronous data based on contention. A channel time allocation period includes a management channel time block (MCTB) and a channel time block (CTB). The MCTB is a period where control information can be transmitted between a coordinator and a device or between devices. The CTB is a period where asynchronous data or isochronous data can be transmitted between a device and a coordinator or between other devices. For each superframe, the number, length and location of CAPs, MCTBs, and CTBs are determined by the coordinator and transmitted to other devices within the piconet through the beacon.

When a random device within the piconet needs to transmit data to the coordinator or other device, the device requests the coordinator to allocate channel resources for data transmission, and the coordinator allocates the channel resources to the device within the range of available channel resources. If the CAP exists within the superframe and the coordinator accepts data transmission in the CAP, the device can transmit data of small capacity through the CAP without being allocated with channel time from the coordinator.

As described above, for data communication between two or more devices belonging to the wireless network, connection for data streaming between the devices should be preceded. In this respect, various methods for simplifying and efficiently performing a connection procedure between devices are being studied.

SUMMARY OF THE INVENTION

A wireless communication system can include a plurality of devices, and one source device can transmit data to two or more sink devices. Although connection between devices should be preceded for data communication between the devices, since a sink device has no status information of a source device, it is difficult to immediately predict connection between the sink device and the source device. Accordingly, it is general that the sink device repeatedly transmits a connect request message until a connection operation with the source device is performed, and that the source device transmits a connect response message for connection success or failure to the sink device in response to each connect request message.

However, this method for repeatedly exchanging messages for connection between devices has problems in that it could lead to waste of a transmission power required for message transmission from each device and interruption of a current operation.

Accordingly, the present invention is directed to a method of exchanging messages and source devices, which substantially obviate ones or more problems due to limitations and disadvantages of the related art.

An object of the present invention is to provide a method of efficiently exchanging messages for connection between devices by providing a sink device with status information for connection of a source device and delay time information for connection with the sink device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of exchanging messages, which are intended for streaming connection with a source device, in a sink device of a wireless network comprises transmitting a connect request message for data streaming to the source device; receiving a connect response message from the source device, the connect response message including connection information indicating the possibility of connection with the source device; and outputting a user interface indicating least one of the connection information included in the connect response message and wait time information required for connection with the source device, on a display module.

If the connection information indicates that connection with the source device has been failed, the user interface is output to a display window indicating any one of 'connection request rejected', 'connection timeout', 'failure due to absence of module', 'connection failure due to invalid command', 'connection delay due to insufficient of resources', 'connection failure due to network handover in progress', 'connection delay due to power status change of module', 'connection delay due to use of module', and 'just connection delay' in accordance with the connection information.

At this time, if the user interface outputs any one of 'connection delay due to a shortage of resources', 'connection delay due to power status change of module', and 'simple connection delay', it further outputs wait time information required for reconnection with the source device.

The wait time included in the wait time information corresponds to a time that passes immediately after the connect response message is transmitted.

If the connect response message includes connection information indicating that connection with the source device has been successfully performed, the method further comprises receiving A/V data from the source device.

If the connect response message includes connection information indicating that connection with the source device has been failed, the method further comprises receiving a reconnect response message that includes connection information indicating the possibility of connection with the source device.

If the reconnect response message includes connection information indicating that connection with the source device has been successfully performed, the method further comprises receiving A/V data from the source device.

If the connect response message includes connection information indicating that connection with the source device has been failed due to a shortage of channel resources in the source device, the method further comprises receiving a stream start notification (Stream_start_notify) message that includes information indicating whether data streaming has been started.

In another aspect of the present invention, a sink device of a wireless network comprises a transmitting module transmitting a connect request message for data streaming to a source device; a receiving module receiving a connect response message from the source device, the connect response message including connection information indicating the possibility of connection with the source device; and a display module outputting a user interface indicating at least one of the connection information included in the connect response message and wait time information required for connection with the source device.

If the connection information indicates that connection with the source device has been failed, the user interface is output to a display window indicating any one of 'connection request reject', 'connection timeout', 'failure due to absence of module', 'connection failure due to invalid command', 'connection delay due to insufficient of resources', 'connection failure due to network change', 'connection delay due to power status change of module', 'connection delay due to use of module', and 'simple connection delay' in accordance with the connection information.

If the user interface outputs any one of 'connection delay due to insufficient of resources', 'connection delay due to power status change of module', and 'simple connection delay', it further outputs wait time information required for reconnection with the source device.

The wait time included in the wait time information corresponds to a time that passes immediately after the connect response message is transmitted.

If the connect response message includes connection information indicating that connection with the source device has been successfully performed, the receiving device receives A/V data from the source device.

If the connect response message includes connection information indicating that connection with the source device has been failed, the receiving module receives a reconnect response message that includes connection information indicating the possibility of connection with the source device.

If the reconnect response message includes connection information indicating that connection with the source device has been successfully performed, the receiving device receives A/V data from the source device.

In other aspect of the present invention, a method of transmitting a data packet from a device of a wireless network comprises transmitting the data packet from the device to other device belonging to the wireless network; wherein a data format of the data packet includes a field that includes information of steps and order of an audio video control (AVC) message generated by an AVC layer, a field that includes information indicating a type of a function to be performed through the AVC message, a field that includes information of a sequence number, and an AVC data field that includes information of an operation to be performed through the function by the device that transmits the data packet.

If the device transmits the data packet to request connection with the other device, the AVC data field further includes a field that includes action code (opcode) indicating that the data packet is transmitted to request connection between the devices.

If the device transmits the data packet in response to the request of connection with the other device, the AVC data field further includes a field that includes action code indicating that the data packet is transmitted to respond the possibility of connection with the other device; a field that includes connection information indicating the possibility of connection with the other device; and a field that includes wait time information required for connection with the other device.

In this case, the AVC data field further includes a field that includes indication information indicating a type of the data format; a format data field that includes data subject to a format type indicated by the indication information; and a length field that includes information of a length of the format data field.

The aforementioned embodiments are only a part of the preferred embodiments of the present invention, and various embodiments on which technical features of the present invention are reflected can be devised and understood by the person with ordinary skill in the art based on the detailed description of the present invention, which will be described later.

According to the embodiment of the present invention, it is possible to efficiently perform connection between the devices in a procedure of exchanging messages for connection management between the devices belonging to the wireless network by providing a sink device with status information for connection of a source device and delay time information for connection with the sink device.

Also, according to one embodiment of the present invention, the sink device does not transmit a connect request message repeatedly through wait-time information until connection with the source device, whereby waste of the transmission power can be reduced.

In addition, according to one embodiment of the present invention, even though channel resources used for data transmission are not sufficient, the source device can perform connection between the devices by receiving required channel resources from the coordinator after providing the sink device with wait-time information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 14 is a diagram illustrating an example of a Result field constituting an AVC message format transmitted and received between WVAN devices according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to a wireless video area network (WVAN) which is a kind of a WPAN.

Figure 1:
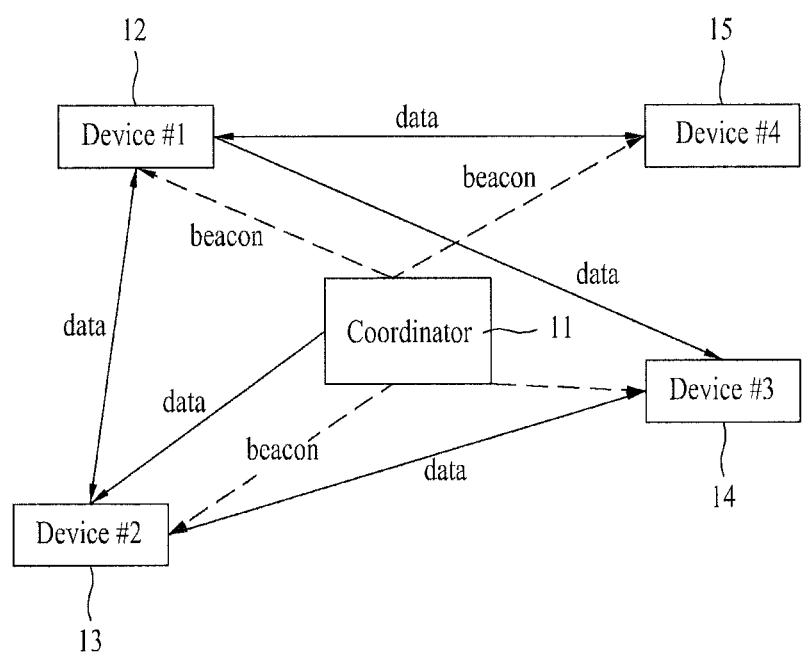
FIG. 1 is a diagram illustrating an example of a WPAN.
Figure 2:
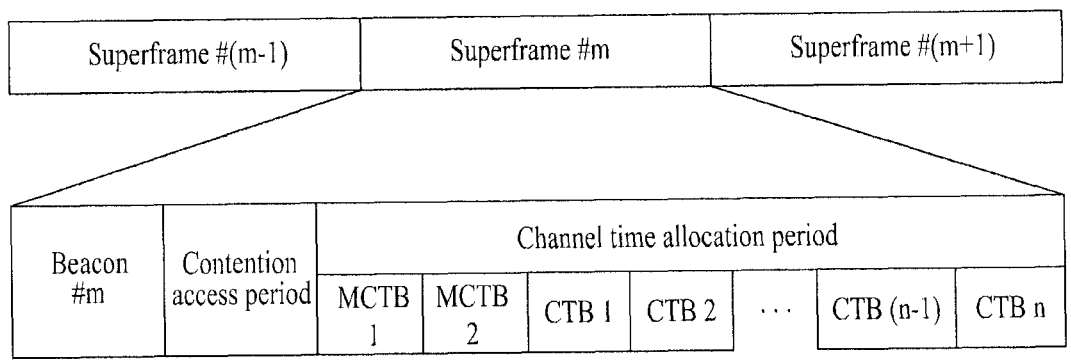
FIG. 2 is a diagram illustrating an example of a superframe used in a piconet.
Figure 3:
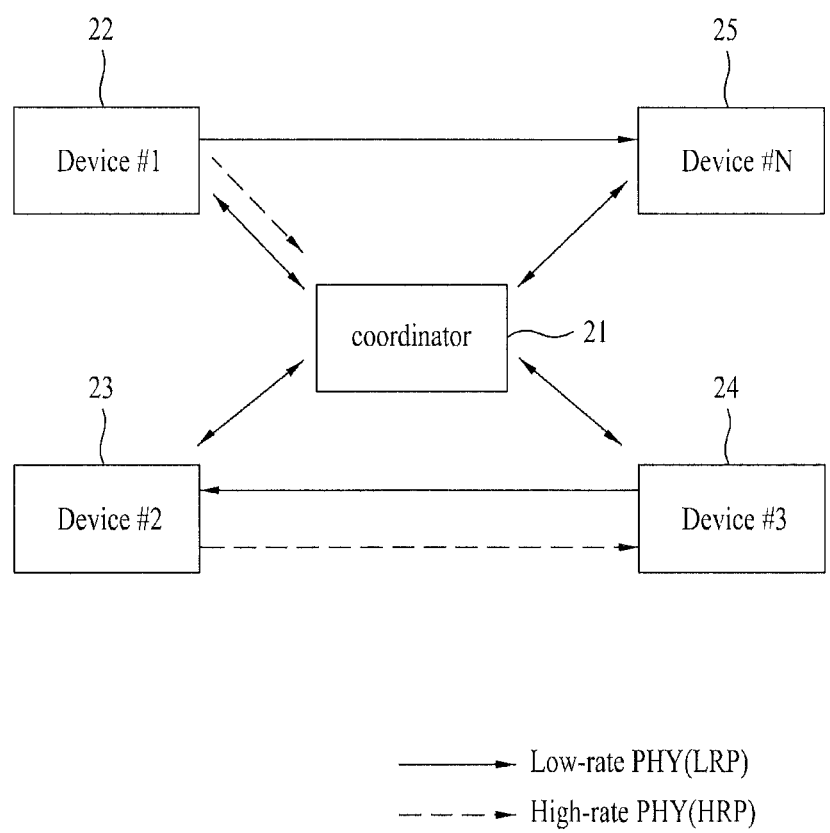
FIG. 3 is a diagram illustrating an example of a WVAN.

FIG. 3 is a diagram illustrating an example of a WVAN. In the same manner as illustrated in FIG. 1, a WVAN of FIG. 3 includes two or more user devices 22 to 25, one of which acts as a coordinator 21. The coordinator 21 provides basic timing of the WVAN, maintains a track of devices belonging to the WVAN, and serves to control quality of service (QoS) requirements. The coordinator 21 performs its function and at the same time serves as one device belonging to the WVAN. Other devices 22 to 25 different from the coordinator 21 can start stream connection.

One of the differences between the WVAN illustrated in FIG. 3 and the WPAN of FIG. 1 is that the WVAN of FIG. 3 supports two kinds of physical (PHY) layers. Namely, the WVAN supports physical layers, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and A/V control data through unicast connection. The LRP layer supports a directional or omni-directional mode and is used for transmission of beacon, asynchronous data, MAC command through unicast or broadcasting. The coordinator 21 can transmit or receive data to and from other device using the HRP and/or LRP layer. The other devices 22 to 25 of the WVAN can also transmit or receive data using the HRP and/or LRP layer. The A/V data mean that data transmitted and received include at least one of audio data and video data.

Figure 4:
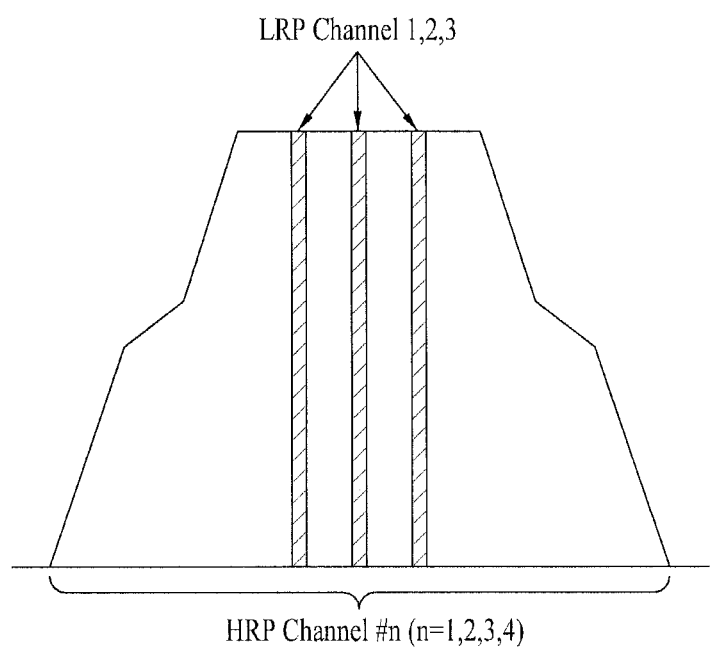
FIG. 4 is a diagram illustrating a frequency band of HRP channels and LRP channels used in a WVAN.

FIG. 4 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 4, the HRP channels and the LRP channels share a frequency band and are used respectively by a TDMA mode.

Figure 5:
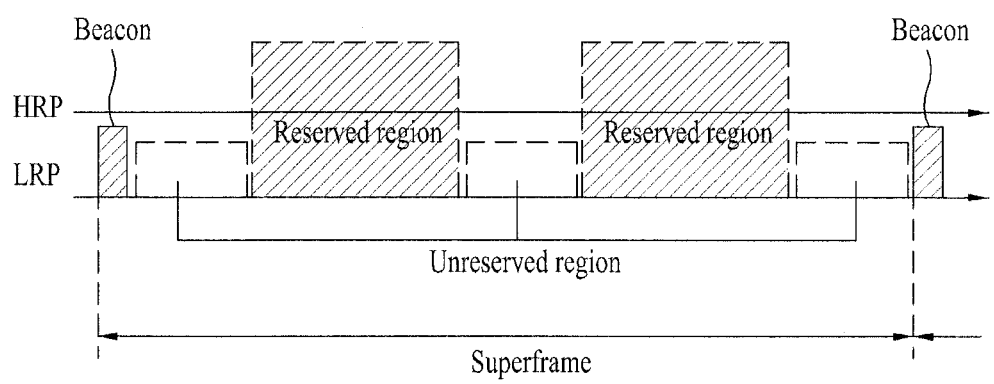
FIG. 5 is a diagram illustrating an example of a structure of a superframe used in a WVAN.

FIG. 5 is a diagram illustrating an example of a structure of a superframe used in a WVAN. Referring to FIG. 5, each superframe includes a beacon region where a beacon is transmitted, a reserved region allocated to a random device by the coordinator in accordance with a request of the devices, and an unreserved region not allocated by the coordinator but transmitting and receiving data between the coordinator and device or between devices in accordance with a contention based mode, wherein each of the regions is time divided. The beacon includes timing allocation information in a corresponding superframe, and management and control information of the WVAN.

The reserved region is used to transmit data from a device, to which channel time is allocated by the coordinator in accordance with a channel time allocation request of the device, to other device. Command, data streams, asynchronous data, etc. can be transmitted through the reserved region. If a specific device transmits data to other device through the reserved region, the HRP channel is used. If the device that receives the data transmits ACK/NACK signal of the received data, the LRP channel is used.

The unreserved region can be used to transmit control information, MAC command, or asynchronous data between the coordinator and the device or between the devices. In order to prevent data collision between the devices in the unreserved region, a carrier sense multiple access (CSMA) mode or a slotted Aloha mode can be used. In the unreserved region, the data can be transmitted through the LRP channel only. If there are many kinds of control information or commands to be transmitted, the reserved region can be set in the LRP channel. In each superframe, the length and the number of reserved regions and unreserved regions can be varied per superframe and are controlled by the coordinator.

Figure 6:
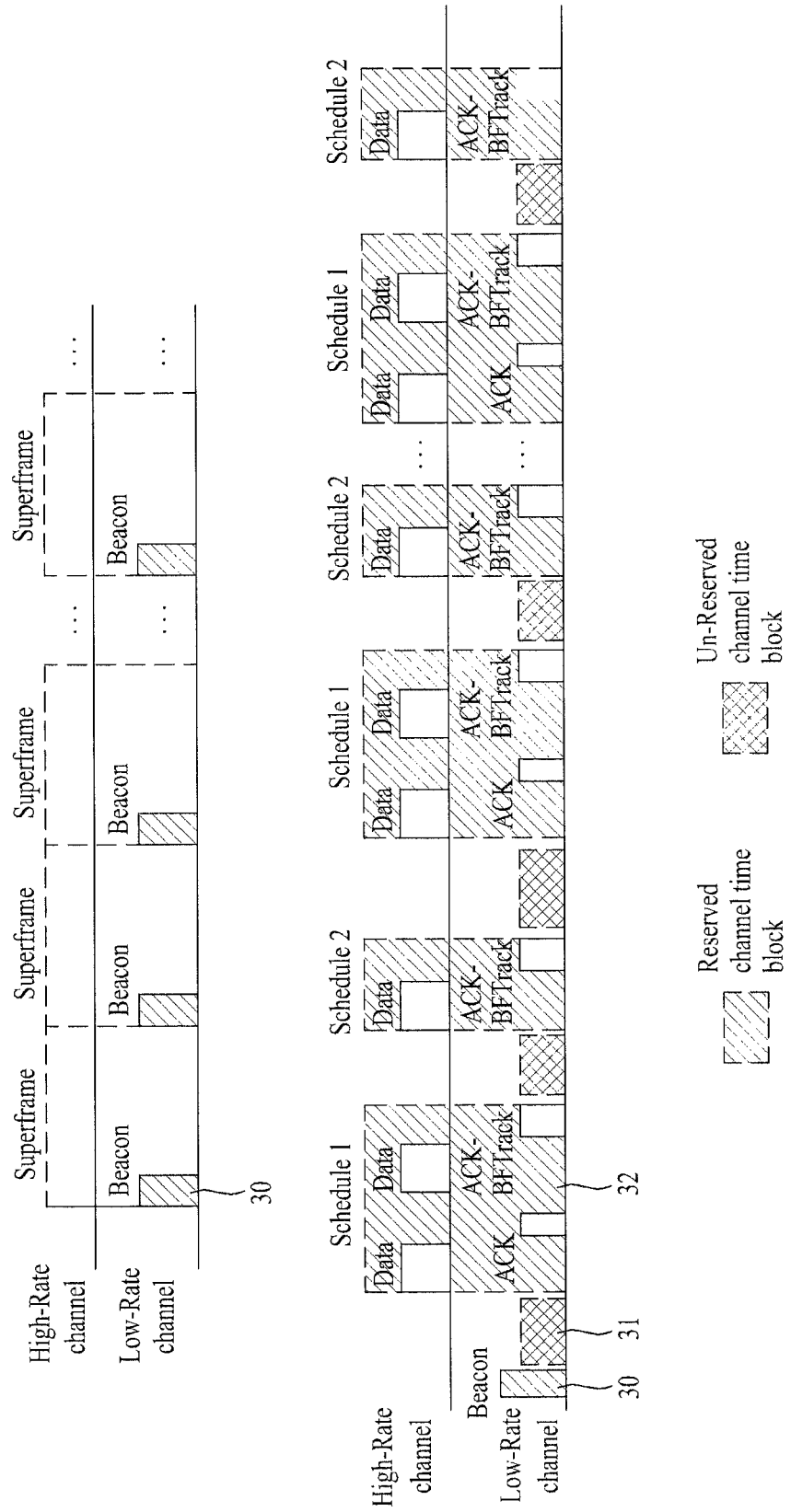
FIG. 6 is a diagram illustrating another example of a structure of a superframe used in a WVAN.

FIG. 6 is a diagram illustrating another example of a structure of a superframe used in a WVAN. Referring to FIG. 6, each superframe includes a beacon field 30 where a beacon is transmitted, a reserved channel time block 32, and an unreserved channel time block 31. Each of the channel time blocks (CTB) is time-divided into a HRP region to which data are transmitted through the HRP layer and a LRP region to which data are transmitted through the LRP layer. The beacon 30 is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. If there are many kinds of control information or commands to be transmitted, the reserved region can be set in the LRP channel. In each superframe, the length and the number of reserved CTB fields and unreserved CTB fields can be varied per superframe and are controlled by the coordinator.

Furthermore, although not shown in FIG. 6, each superframe includes a contention-based control period (CBCP) located next to the beacon to transmit urgent control/management messages. The length of the CBCP is set so as not to exceed a given threshold value mMAXCBCPLen.

Figure 7:
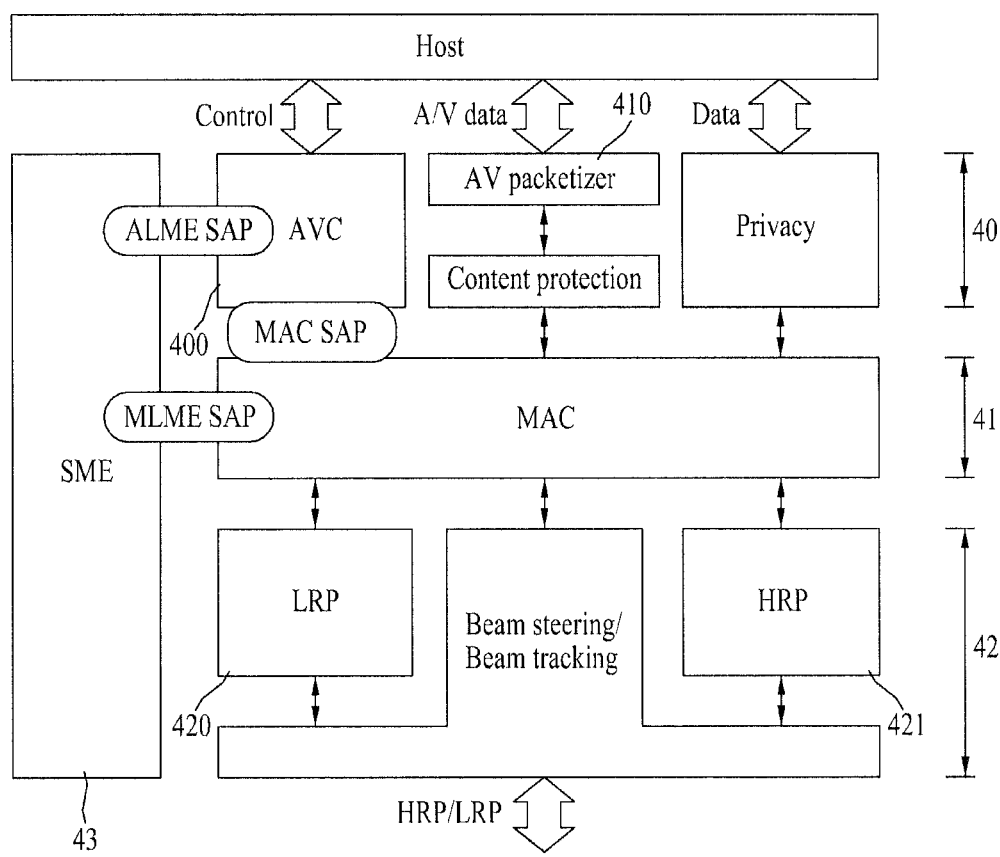
FIG. 7 is a diagram illustrating a protocol layer structure implemented in a device of a WVAN.

FIG. 7 is a diagram illustrating a protocol layer structure implemented in a device of a WVAN.

Referring to FIG. 7, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device for identifying the coordinator, and the station management entity (SME) means a device management entity (DME). The station management entity (SME) is a layer independent entity that controls a lower layer and collects status information of device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 directly processes A/V data, or the A/V data may be processed simultaneously by the PHY layer 42 and the MAC layer 31. The PHY layer is responsible for the task to convert a message requested from the upper layers such as the adaptation layer 30 and the MAC layer 41, so that the message can be sent and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers is referred to as primitive.

Figure 8:
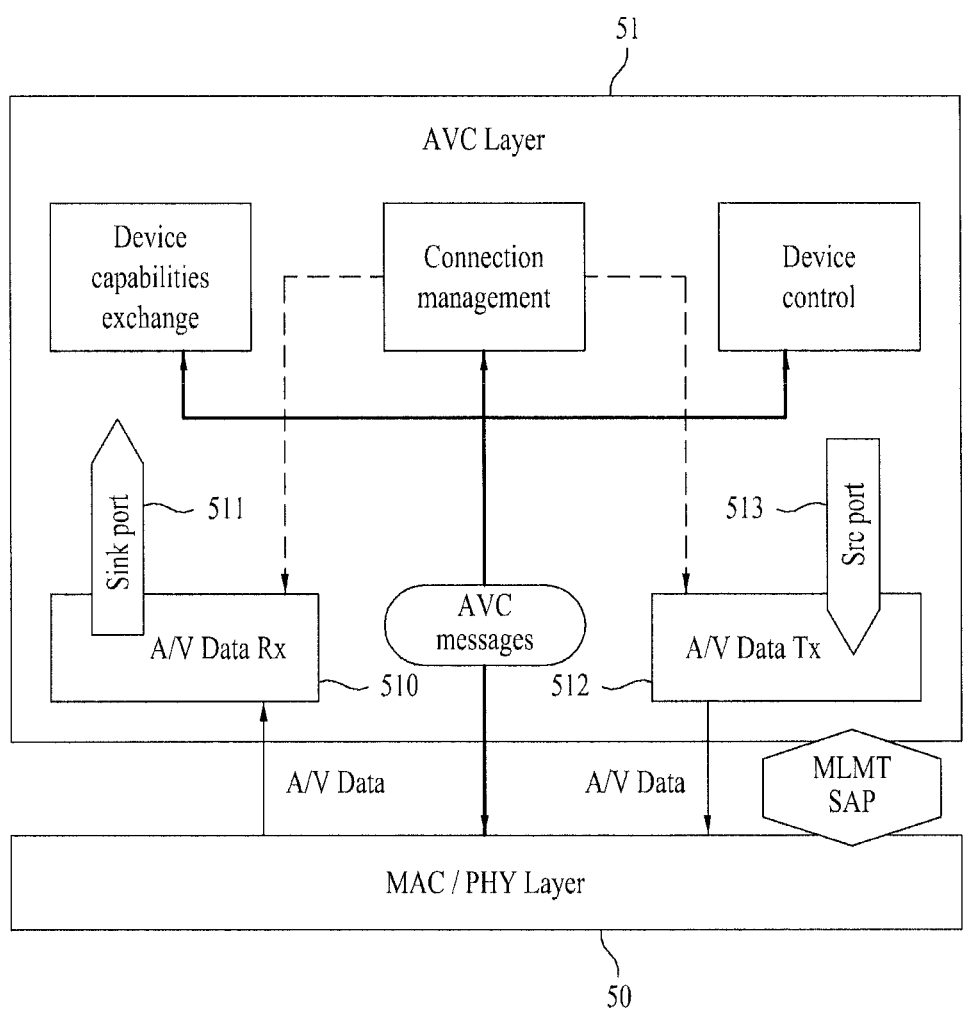
FIG. 8 is a diagram illustrating an example of a protocol layer structure implemented in a device of a WVAN according to one embodiment of the present invention.

FIG. 8 is a diagram illustrating an example of a protocol layer structure implemented in a device of a WVAN according to one embodiment of the present invention.

Referring to FIG. 8, a communication module of a device included in the WVAN includes a MAC/PHY layer 50 and an AVC layer 51 depending on its function. If the device acts as a sink device, the AVC layer 51 includes a receiving module 510 receiving A/V data from the outside and one or more sink device input ports (sink port) 511. Also, the device acts as a source device, the AVC layer 51 includes a transmitting module 512 transmitting A/V data to the outside and one or more source device transmitting ports (Src port) 513. The input port 511 is connected with the transmitting port 513 by a connection management function between the devices.

Generally, the AVC layer 51 performs device capabilities exchange, connection management for A/V data transmission between the source device and the sink device, power on/off of other device, and device status control such as operation/stop. The AVC layer 51 can perform aforementioned functions by exchanging AVC message with other device.

Device capabilities exchange is intended to allow one device to exchange parameter information, which can represent device capabilities, with another device belonging to the same network. Examples of the parameter that can represent device capabilities include HRP channel and LRP channel type used to transmit a wireless signal, a category to which the device belongs, a parameter indicating whether A/V data have been transmitted or received, and a type of data transmitted and received. Device capabilities request and transmission can be performed using AVC message.

Connection between the devices is to perform connection or disconnection of A/V data streaming between the source device and sink device. For example, if the device shown in FIG. 8 is a source device, the AVC layer 51 generates AVC message for connection request for data transmission to the sink device and transmits the generated AVC message to the sink device through a MAC/PHY layer 50. Also, the AVC layer 51 receives a response AVC message to the connect request message generated by the AVC layer of the sink device through the MAC/PHY layer 50, and performs connection management with the sink device based on information included in the response AVC message.

At this time, device connection management can be performed for A/V data streaming between one source device and one sink device, and can also be applied between one sink device and two or more source devices. When the first source device transmits A/V data to the sink device, the second source device may transmit A/V data to the sink device. In this case, the sink device disconnects or delays streaming connection with the first source device, and receives A/V data by connecting with the source device. Connection management between the sink device and the first device is generally performed in such a manner that the sink device notifies the first device of a streaming disconnection message in accordance with connection request of the second device.

In order to perform communication between the devices in the wireless network before connection management between the devices, the device should be allocated with channel resources of a certain amount from the coordinator.

Figure 9:
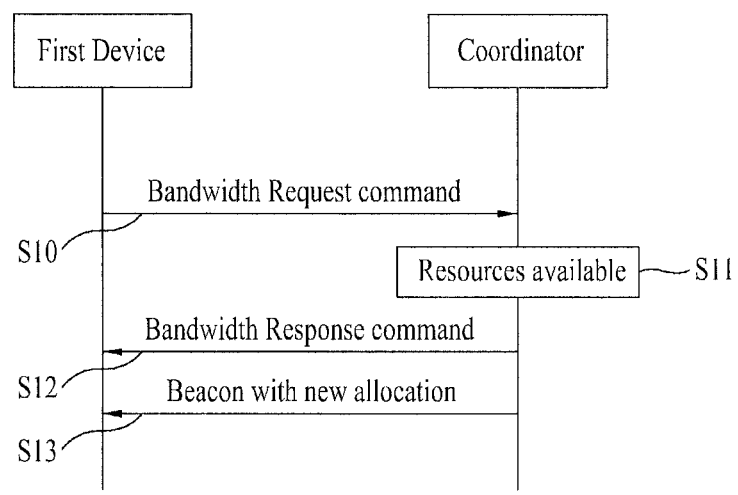
FIG. 9 is a flow chart illustrating an example of a procedure of receiving channel resources from a coordinator to a random device in a wireless network.

FIG. 9 is a flow chart illustrating an example of a procedure of receiving channel resources from a coordinator to a random device in a wireless network.

Referring to FIG. 9, the device transmits a channel resource request message (bandwidth request command) to the coordinator to receive channel resources for data transmission (S10). The bandwidth request command is intended by the device to request the coordinator to allocate, change or terminate channel resources, whereby the device can perform the procedure related to data transmission to the coordinator or other device. The coordinator that has received the request message searches for available channel resources to be allocated to the device (S11). At this time, the coordinator searches for a channel having a minimum interference rate, and as a result, if there are available channel resources, the coordinator transmits a bandwidth response command, which indicates that the requested channel resources will be allocated, to the device (S12). The coordinator transmits information of range or type of the channel resources, which are to be newly allocated, to the device through a beacon (S13). At this time, other devices belonging to the WVAN can also receive the information indicating that the channel resources of a certain amount will be allocated from the coordinator to the device. The device that has been allocated with the channel resources from the coordinator can transmit data to other device of the wireless network by using the allocated channel resources.

Connection management between devices should be performed even for the WVAN device that has been allocated with the channel resources, so as to transmit and receive data.

Generally, connection between devices is performed in such a manner that the first device transmits a connect request message to the second device and the second device transmits a response message, which includes information as to connection possibility for the connection request, to the first device. At this time, if the response message includes response of connection failure, the first device does not attempt connection with the second device or repeatedly performs connection request with the second device until connection between devices is performed. Such repetition of connection request is caused that the first device has no wait-time information required for connection with the second device.

Accordingly, the present invention relates to a method of performing connection management between devices that provide wait-time information during connection failure in connection management between WVAN devices.

Figure 10:
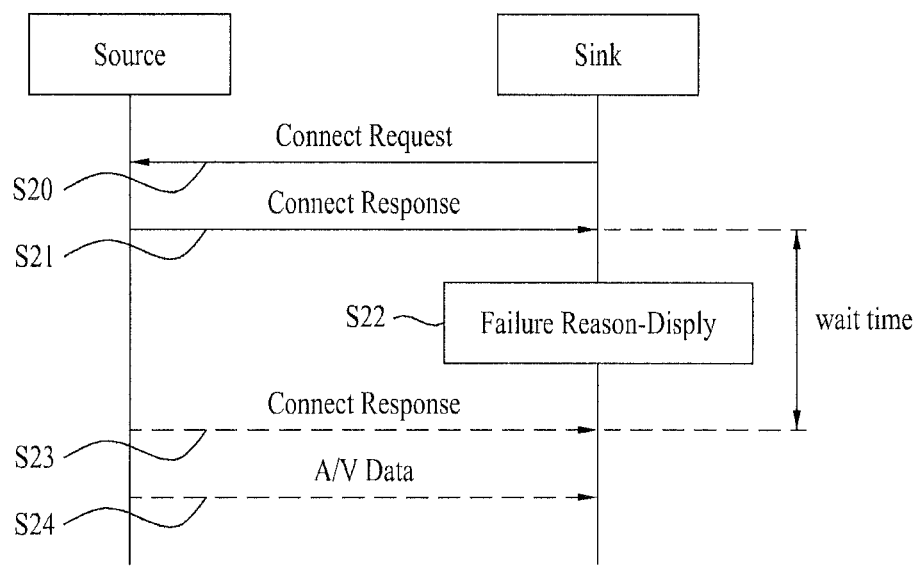
FIG. 10 is a flow chart illustrating an example of a procedure of exchanging messages between WVAN devices according to one embodiment of the present invention.

FIG. 10 is a flow chart illustrating an example of a procedure of exchanging messages between WVAN devices according to one embodiment of the present invention.

In more detail, FIG. 10 illustrates an example of a procedure of exchanging messages to perform streaming connection between a source device and a sink device. In FIG. 10, it is assumed that the source device is allocated with channel resources of a certain amount from the coordinator in the same manner as FIG. 9 and transmits data to other device through the allocated channel resources.

Referring to FIG. 10, the sink device transmits a connect request message (Connect_Request) to source device to request connection between devices for reservation of port and bandwidth used for data streaming (S20). The source device that has received the connect request message transmits a first connect response message (Connect_Response) to the sink device to accept or reject the connection request of the sink device depending on the reserved status of the port, etc. At this time, if data streaming connection cannot be performed, the source device according to one embodiment of the present invention can transmit the response message of connection failure together with wait-time information predicted until it is connected with the sink device depending on a failure reason. The wait-time information corresponds to the time required until connection is successfully performed after reconnection. Although connection between devices may be difficult at the time when the connect request message is received, the wait-time information is included in the first connect response message when connection is successfully performed by reconnection attempt. The sink device that has received the first connect response message can display information as to connection success or failure, a failure reason during connection failure, and wait-time information through the display module provided therein (S22).

The source device reattempts connection with the sink device automatically if the wait-time passes, and transmits a second response message, which includes information as to connection success or failure, to the sink device (S23). The source device can reattempt connection with the sink device in accordance with a manner which is previously set if the connection failure reason is solved even within the wait-time. Also, the source device can transmit a second response message of connection success even within the wait-time. If connection with the sink device is successfully performed, the source device does not transmit the second response message and transmits data by connecting with the sink device (S24).

Although not shown in FIG. 10, the sink device that has received the second response message can output information as to the possibility of connection with the source device through the display module.

As shown in FIG. 10, the connection request between devices is performed in such a manner that the sink device transmits the connect request message to the source device and the source device transmits the connect request message to the sink device to perform data transmission.

As described above, connection management between the sink device and the source device is performed by the AVC layer 51 of each device, and AVC message generated by the AVC layer is used as the message exchanged for connection management. Generally, the AVC message is used for connection management between devices and control of other device, and can be transmitted in an LRP mode.

Figure 11:
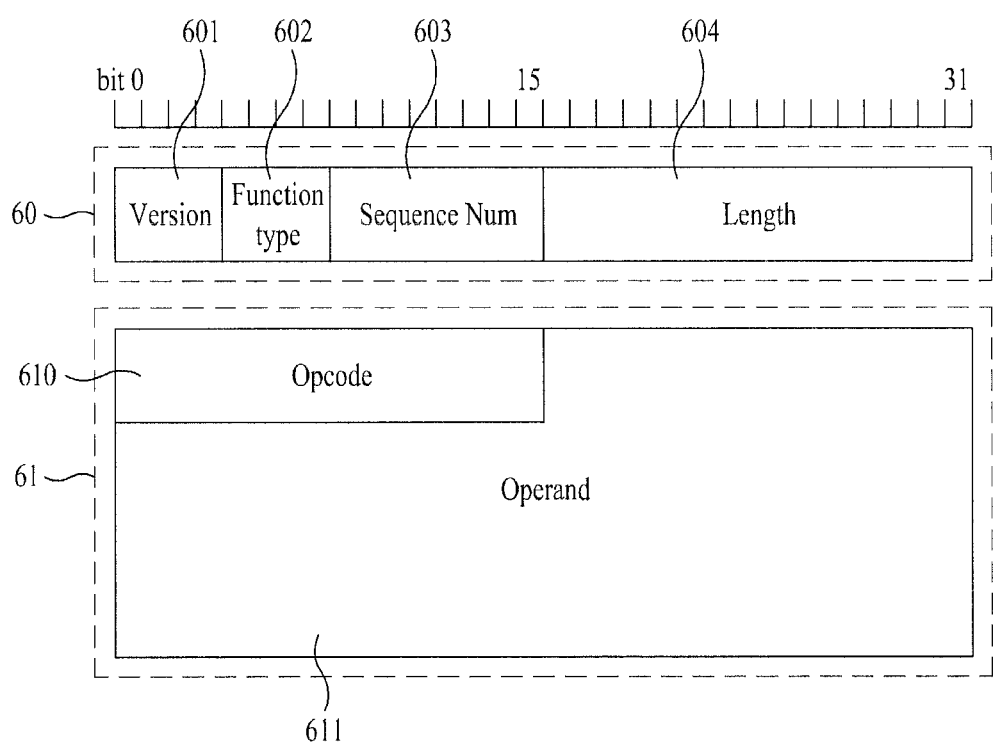
FIG. 11 is a diagram illustrating an example of an AVC message format transmitted and received between WVAN devices according to one embodiment of the present invention.

FIG. 11 is a diagram illustrating an example of an AVC message format transmitted and received between WVAN devices according to one embodiment of the present invention.

Referring to FIG. 11, the AVC message includes an AVC header 60 and an AVC data field 61. A total of 4 octets are allocated to the AVC header 60, and the AVC header 60 includes a version field 601 that includes information of steps and order of the AVC message, a function type field 602 that includes information of a function type to be performed through the AVC message, a sequence number field 603, and a length field 604 that includes information of a message length included in the AVC data field.

The function type field 602 includes indication information indicating a specific function to be performed through the current AVC message, among one or more functions performed by the AVC layer. Table 1 illustrates an example of a function defined by a bit value corresponding to the field 602.

TABLE 1

| Value | Function type |
|---|---|
| 0 | Connection management |
| 1 | Device control |
| 2 | A/V clock regeneration |
| 3 | Content protection |
| 4 | HDMI pass through |
| 5~F | Reserved for future specification |

Referring to Table 1, if the bit value is set to '0' in the function type field 602, it indicates a connection management function between devices. If the bit value is set to '1' in the function type field 602, it indicates a device control function. If the bit value is set to '2' in the function type field 602, it indicates an A/V clock reproduction function. If the bit value is set to '3' in the function type field 602, it indicates a contents protection function. If the bit value is set to '4' in the function type field 602, it indicates a high-definition multimedia interface (HDMI) path pass mode. If the bit value is set to '5~F' in the function type field 602, it indicates a reserved status. The function type represented by the corresponding bit value in the function type field 602 is exemplary to represent information of a type of the AVC message. The bit values are not limited to the aforementioned values.

The sequence number represented by the sequence number field 603 increases by 1 and is reset to 0 if it reaches a maximum number or the devices completes the related function.

Next, the AVC data field 61 includes an Opcode field 610 and an Operand field 611, wherein the Opcode field includes information of detailed operation in the function to be performed through the AVC message.

Table 2 illustrates an example of action code set on the Opcode field 610.

TABLE 2

| Opcode Value | Operation code type |
|---|---|
| 0 | DEVICE_CAPABILITY_REQUEST |
| 1 | DEVICE_CAPABILITY_RESPONSE |
| 2 | CONNECT_REQUEST |
| 3 | CONNECT_RESPONSE |
| 4 | DISCONNECT_REQUEST |
| 5 | STREAM_START_NOTIFY |
| 6 | OUTPUT_FORMAT_NOTIFY |
| 7 | FAST_FORMAT_ADAPTATION_REQUEST |
| 8 | FAST_FORMAT_ADAPTATION_RESPONSE |
| 9 | DISCONNECT_RESPONSE |
| A~F | Reserved |

Referring to Table 2, if the Opcode value is set to '0', it indicates that the corresponding AVC message is a device capability request (DEVICE_CAPABILITY_REQUEST) message.

If the Opcode value is set to '1', it indicates that the corresponding AVC message is a device capability response (DEVICE_CAPABILITY_RESPONSE) message. If the Opcode value is set to '2', it indicates that the corresponding AVC message is a connect request (CONNECT_REQUEST) message. If the Opcode value is set to '3', it indicates that the corresponding AVC message is a connect response (CONNECT_RESPONSE) message. If the Opcode value is set to '4', it indicates that the corresponding AVC message is a device disconnect request (DISCONNECT_REQUEST) message. If the Opcode value is set to it indicates that the corresponding AVC message is a streaming start (STREAM_START_NOTIFY) message indicating data stream start between the devices. If the Opcode value is set to '6', it indicates that the corresponding AVC message is an output format data (OUTPUT_FORMAT_NOTIFY) message for transmitting output format data. This output format data message is generally used to notify what data will be transmitted from the source device to the sink device. If the Opcode value is set to '7', it indicates that the corresponding AVC message is a fast adaptation request (FAST_FORMAT_ADAPTATION_REQUEST) message. If the Opcode value is set to '8', it indicates that the corresponding AVC message is a response message (FAST_FORMAT_ADAPTATION_RESPONSE). If the Opcode value is set to '9' it indicates that use of the corresponding AVC message is reserved.

Action codes listed in Table 1 are examples of Opcode included in the AVC message, and are not limited to the values of Table 1. Message types set per Opcode values may be changed to each other.

The OPERAND field 611 includes different formats depending on the message corresponding to the action codes set in the Opcode field 610. Requirements or information substantially included in the AVC message can be included in the Operand field 611.

Figure 12:
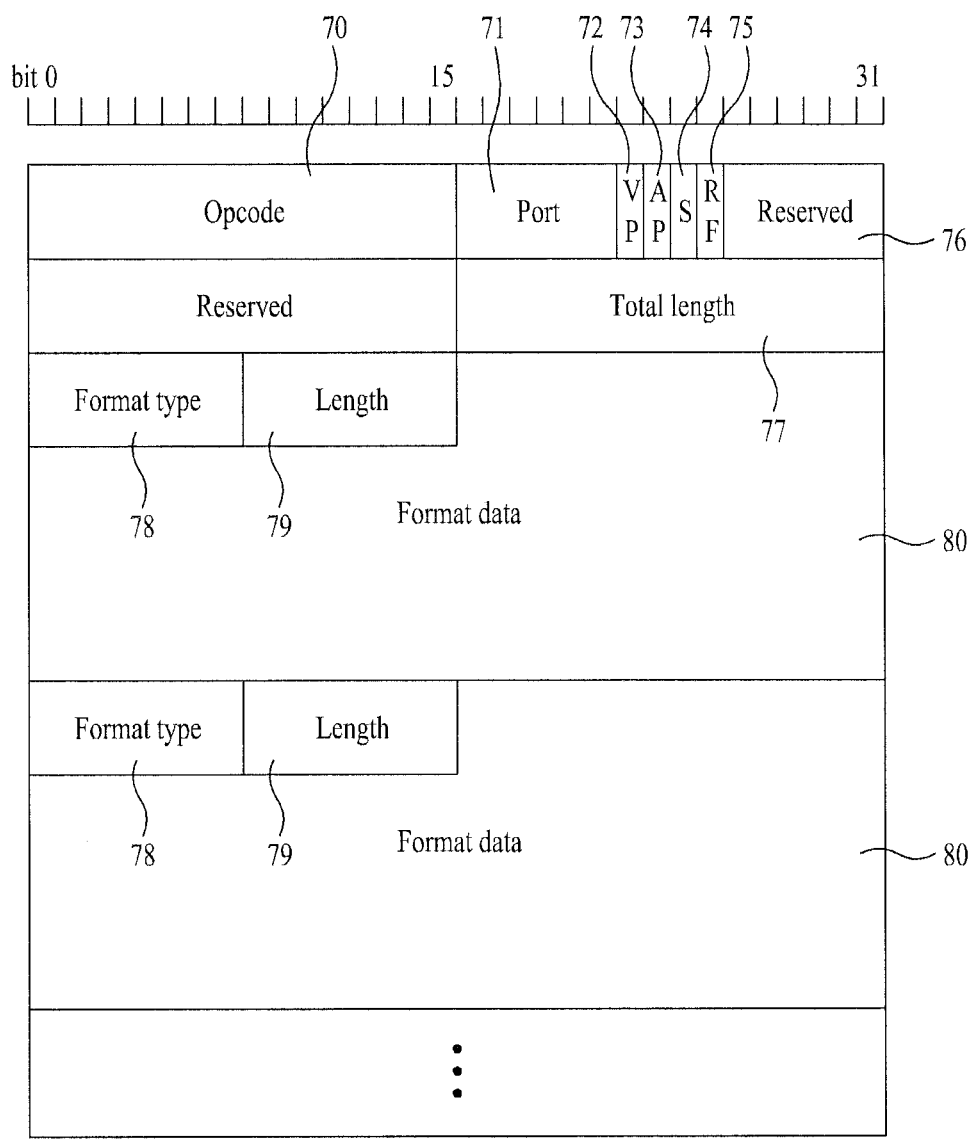
FIG. 12 is a diagram illustrating another example of an AVC message format transmitted and received between WVAN devices according to one embodiment of the present invention.

FIG. 12 is a diagram illustrating another example of an AVC message format transmitted and received between WVAN devices according to one embodiment of the present invention. In more detail, FIG. 12 illustrates an example of an AVC data field constituting a connect request (Connect_request) message transmitted in the step S20 of FIG. 10.

Generally, the connect request (Connect_request) message is used by the sink device to request the source device to start a procedure of reserving a bandwidth, or is used by the source device to request a specific sink device to request streaming connection for transmitting A/V data to the sink device. Also, the connect request (Connect_request) message is used by the source device to request the sink device to receive A/V data from a specific sink port.

Referring to FIG. 12, the connect request message format includes an Opcode field 70 that includes action code, a port field 71 that includes indication information indicating that a port used for connection is a Sink port or Src port, a video port (VP) field 72 that includes indication information indicating whether a port used for video data transmission is used, and an audio port (AP) field 73 that includes indication information indicating whether a port used for audio data transmission is used. Also, the connect request message format includes a field (S) 74 that includes indication information indicating whether a port to be used is a Sink port or Src port, a request format (RF) field 75 that includes information as to whether the source device requests a data format, and a reserved field 76. 1 bit is allocated to the S field 74. For example, if the sink device starts the connection procedure, a bit indicating Sinkport is set in the port field 71 and a bit value of '1' is set in the S field 74. On the other hand, if the source device starts the connection procedure, a bit indicating Srcport is set in the port field 71 and a bit value of '0' is set in the S field 74.

According to one embodiment of the present invention, the connect request message format transmitted from the sink device to the source device can represent a connect request message by setting a bit value of '2' in the Opcode field 70 as illustrated in Table 1.

In addition, the AVC message data format for connection request includes one or more data fields that include a total length field 77 that includes information of a total length of a TLV (format type, length, value) field, a format type field 78 that includes information of a format data type, a length field 79 that includes length information of the format data field 80, and a format data field 79 that includes format data.

The source device according to one embodiment of the present invention determines the possibility of connection with the sink device after receiving the connect request message, and then transmits the connect response message to the sink device.

Figure 13:
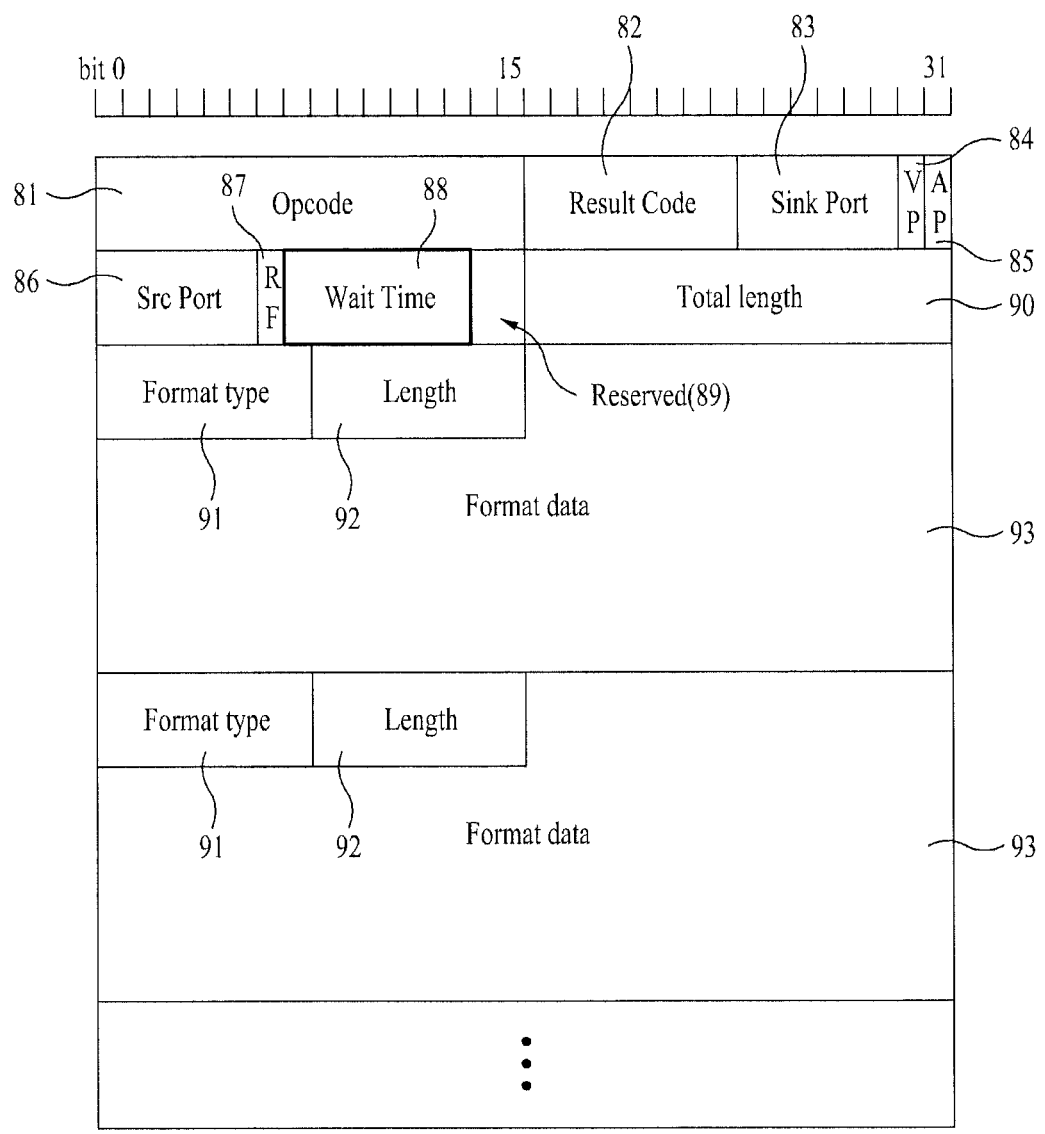
FIG. 13 is a diagram illustrating another example of an AVC message format transmitted and received between WVAN devices according to one embodiment of the present invention.

FIG. 13 is a diagram illustrating another example of an AVC message format transmitted and received between WVAN devices according to one embodiment of the present invention. In more detail, FIG. 13 illustrates an example of an AVC data field constituting a connect response (Connect_response) message transmitted in the step S21 of FIG. 10.

Referring to FIG. 13, the connect response message format according to one embodiment of the present invention includes an Opcode field 81 that includes information of action code, a result code field 82 that includes information of a reason of a response type, a Sinkport field 83 that includes information of a Sinkport number reserved for A/V data transmission, a video port (VP) field 84 that includes indication information indicating whether a video port for video data transmission is used, an audio port (AP) field 85 that includes indication information indicating whether an audio port for audio data transmission is used, a Srcport field 86 that includes number information of Scrport reserved for A/V data transmission, a request format (RF) field 87 that includes information as to whether a supported data format is requested, a wait time field 88 that includes wait time information, and a reserved field 89.

In addition, as shown in FIG. 13, the AVC data format of the connect response message according to one embodiment of the present invention includes one or more data fields that include a total length field 90 that includes information of a total length of a TLV field, a format type field 91 that includes information of a format data type, a length field 92 that includes length information of the format data field 93, and a format data field 93 that includes format data.

FIG. 14 is a diagram illustrating an example of a Result field constituting an AVC message format transmitted and received between WVAN devices according to one embodiment of the present invention. In more detail, FIG. 14 illustrates an example of a response type defined by a bit value set in the result code field 82 of FIG. 13 and a reason of the response type.

Referring to FIG. 14, the result code field 82 of FIG. 13 includes a result field 820 that includes information indicating whether requirements included in the request message have been implemented and a reason field 821 that includes information of the reason of the response.

If the bit value of the result field 820 is set to '0', it indicates a grant response of the connection request. If the bit value of the result field 820 is set to '1', it indicates a rejection response of the connection request. If the bit value of the result field 820 is set to '2~3', it indicates that use of the corresponding field is reserved. The bit values set in the result field 821 are only exemplary, and the response types defined by '0' and '1' can be changed to each other.

The reason field 821 includes reason code which is information indicating a reason of the response included in the result field 820.

If the response message according to one embodiment of the present invention indicates request grand response, the bit value is set to '0' in the reason field 821 to indicate grant response.

On the other hand, if the response message indicates request rejection response, the reason field 821 can include information of various reason types of rejection response. As shown in FIG. 14, if the bit value of the reason field is set to '0', it means rejection of request of the device that has transmitted the request message. If the bit value of the reason field is set to '1', it indicates failure due to timeout. If the bit value of the reason field is set to '2', it indicates that the device that has received the request message does not take part in the wireless network currently. If the bit value of the reason field is set to '3', it indicates that the requirements included in the request message are a parameter not useful in the receiving device.

Also, if the bit value of the reason field is set to '4', it indicates that resources of the receiving device are not sufficient in performing the requirements included in the request message. If the bit value of the reason field is set to '5', it indicates that handover is being performed. If the bit value of the reason field is set to '6', it indicates that the receiving device terminates the system. If the bit value of the reason field is set to '7', it indicates that the receiving device cannot perform the requirements currently as it performs other function. If the bit value of the reason field is set to '8', it indicates information indicating that the receiving device cannot perform the requirements immediately but connection can be performed after the passage of certain wait time. If the bit value of the reason field is set to '9~62', it indicates that use of the reason field is reserved.

Referring to FIG. 13 again, the wait time field 89 includes wait time information indicating the time required for connection of the source device, which transmits the connection failure response message in the aforementioned embodiment, with the sink device. Maximum 12.8 seconds in a 100 millisecond unit can be allowed as the wait time information according to one embodiment of the present invention. However, the maximum time unit and the maximum available wait time can be increased and reduced in accordance with the device. If connection reattempt is not performed depending on failure reason, the source device may not transmit the wait time information. If the source device does not transmit the wait time information, the wait time field 88 can be extended to the reserved field 89.

Accordingly, the source device according to one embodiment of the present invention can notify the sink device of time information required for connection through the connect response message transmitted to the sink device, wherein the connect response message includes the reason code and the wait time information.

Hereinafter, the procedures of transmitting the connection failure response message from the source device according to one embodiment of the present invention to the sink device due to various connection failure reasons described in FIG. 14 in response to the connection request will be described.

FIG. 15 to FIG. 24 are flow charts illustrating an example of a procedure of exchanging messages for request of connection between WVAN devices according to one embodiment of the present invention.

In more detail, each of FIG. 15 to FIG. 24 illustrates an example of a procedure of transmitting a response message of connection failure from the source device according to one embodiment of the present invention to the sink device in response to connection request of the sink device. In this case, connection reattempt is not performed during connection failure, and the connect response message may not include wait time information.

Figure 15:
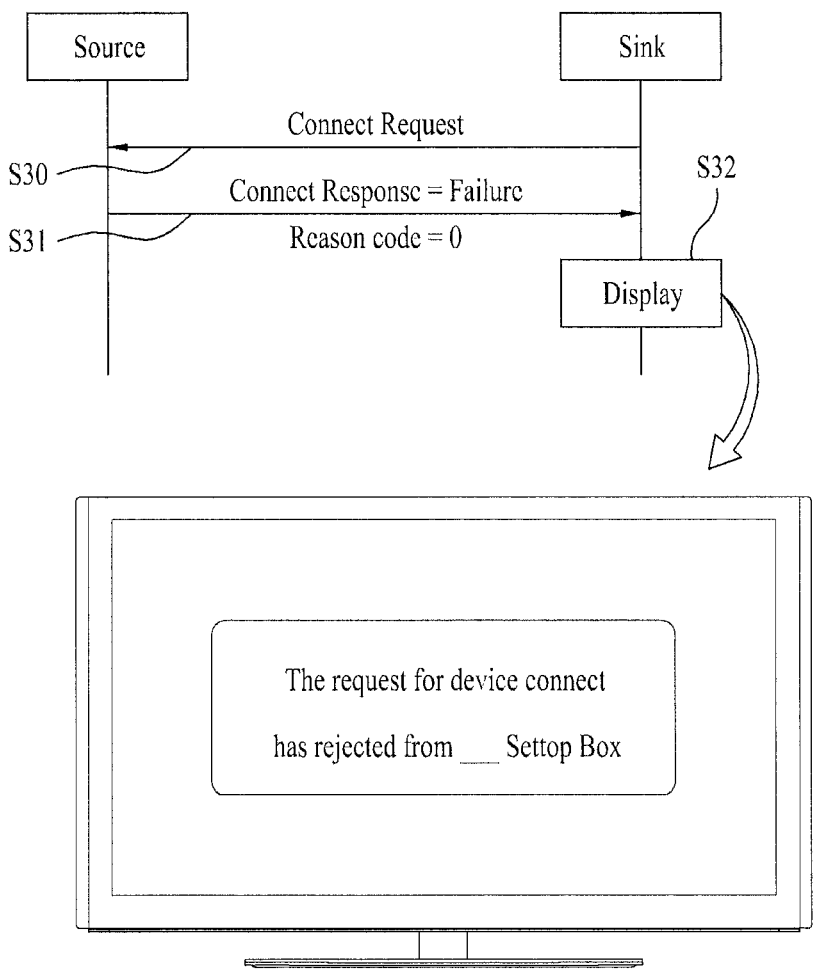
FIG. 15 is a flow chart illustrating an example of a procedure of exchanging messages for request of connection between WVAN devices according to one embodiment of the present invention.

FIG. 15 is a diagram illustrating an example of exchanging messages for request of connection between WVAN devices according to one embodiment of the present invention.

Referring to FIG. 15, when the sink device according to one embodiment of the present invention has transmitted a connect request message to the source device to be connected with itself (S30), the source device may reject the connection request of the sink device. In this case, the source device can transmit a connect response message, which includes connection failure indication information and a reason code of request rejection, to the sink device as shown in FIG. 15 (S31). The reason code can be set to '0' in accordance with code values listed in FIG. 14. The sink device that has received the connect response message outputs a connection request result such as 'connection request rejection' on the display module provided therein (S32).

Figure 16:
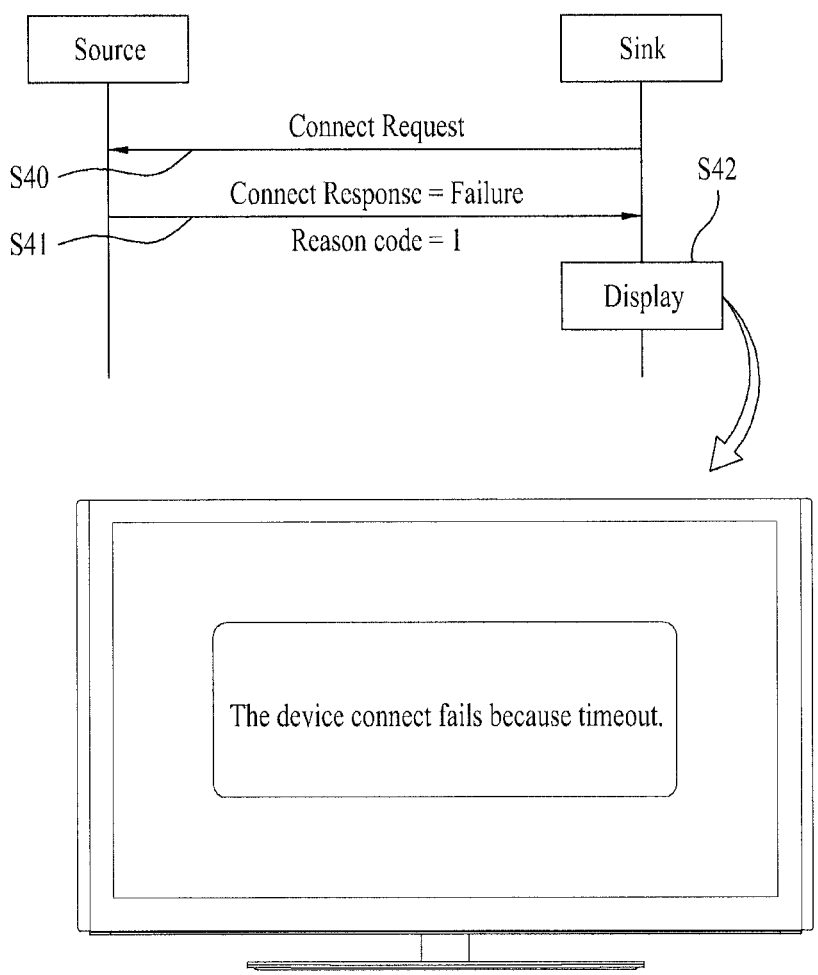
FIG. 16 is a flow chart illustrating another example of a procedure of exchanging messages for request of connection between WVAN devices according to one embodiment of the present invention.

FIG. 16 is a flow chart illustrating another example of a procedure of exchanging messages for request of connection between WVAN devices according to one embodiment of the present invention.

Referring to FIG. 16, when the sink device according to one embodiment of the present invention has transmitted a connect request message to the source device (S40), the source device may not perform connection successfully due to the passage of connection time which is previously set during connection attempt of the sink device. In this case, the source device can transmit a connect response message, which includes connection failure indication information due to timeout and a reason code, to the sink device as shown in FIG. 16 (S41). The reason code can be set to '1' in accordance with code values listed in FIG. 14. The sink device that has received the connect response message outputs a connection request result such as 'timeout' on the display module provided therein (S42).

Figure 17:
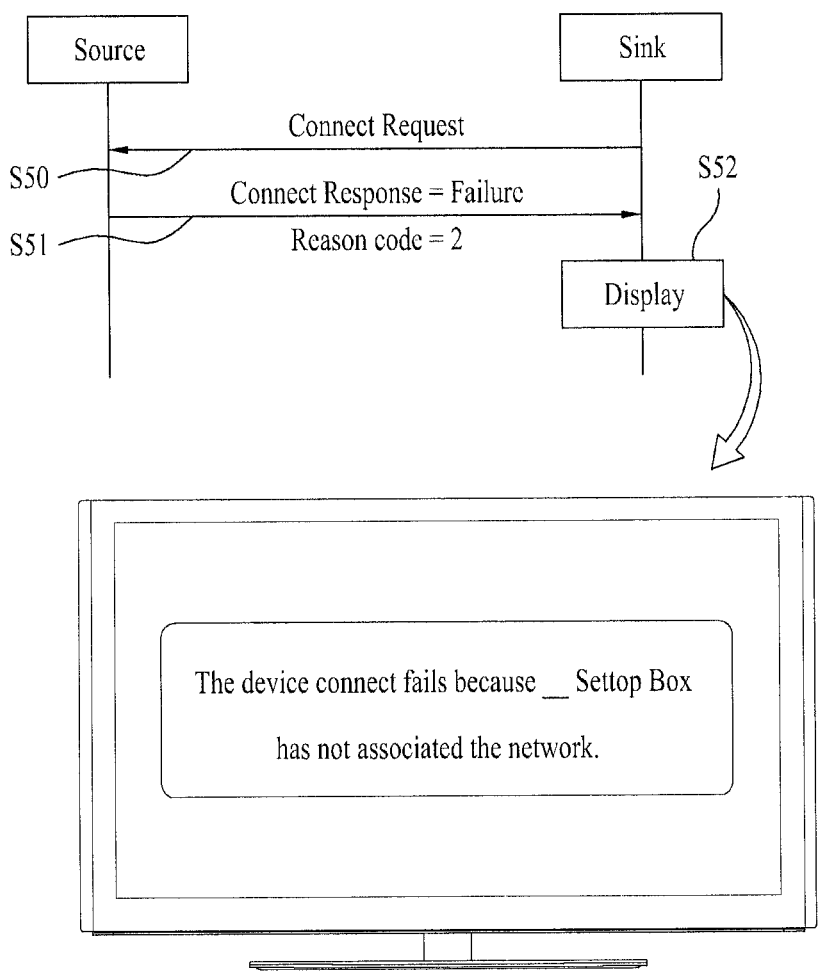
FIG. 17 is a flow chart illustrating another example of a procedure of exchanging messages for request of connection between WVAN devices according to one embodiment of the present invention.

FIG. 17 is a flow chart illustrating another example of a procedure of exchanging messages for request of connection between WVAN devices according to one embodiment of the present invention.

Referring to FIG. 17, when the sink device according to one embodiment of the present invention has transmitted a connect request message to the source device to be connected with itself (S50), the source device may not perform streaming connection as it does not belong to the same network as that of the sink device. Alternatively, the source device may not be associated with a connection module requested from the sink device. In this case, the source device can transmit a connect response message, which includes connection failure indication information due to absence of the corresponding module and a reason code, to the sink device as shown in FIG. 17 (S51). The reason code can be set to '2' in accordance with code values listed in FIG. 14. The sink device that has received the connect response message outputs a connection request result such as 'Not associated' on the display module provided therein (S52).

Figure 18:
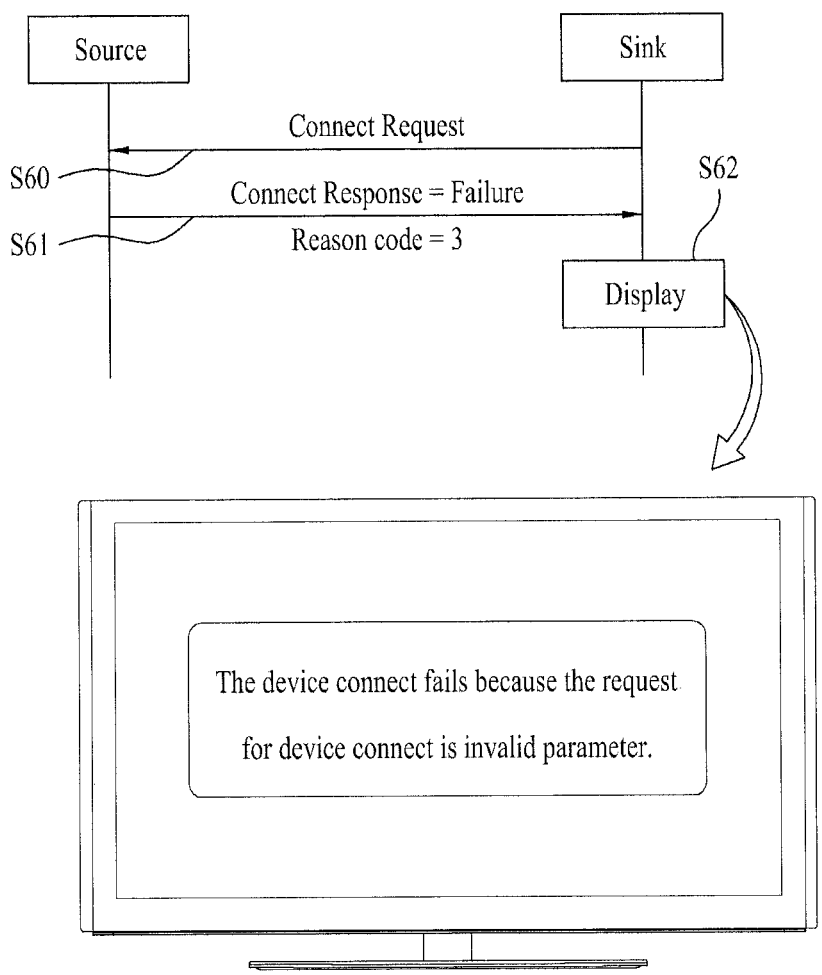
FIG. 18 is a flow chart illustrating another example of a procedure of exchanging messages for request of connection between WVAN devices according to one embodiment of the present invention.

FIG. 18 is a flow chart illustrating another example of a procedure of exchanging messages for request of connection between WVAN devices according to one embodiment of the present invention.

Referring to FIG. 18, when the sink device according to one embodiment of the present invention has transmitted a connect request message to the device to be connected with itself (S60), the device may be a sink device or a passive source device, which does not support data streaming. Alternatively, even though the device is an active source device that supports data streaming, it should transmit a response message of rejection if a function that is not supported by itself is requested from the sink device. In this case, the device that has received the request message can transmit a connect response message, which includes connection failure indication information and a reason code indicating a wrong command, to the sink device as shown in FIG. 18 (S61). The reason code can be set to '3' in accordance with code values listed in FIG. 14. The sink device that has received the connect response message outputs a connection request result such as 'wrong command' on the display module provided therein (S62).

Figure 19:
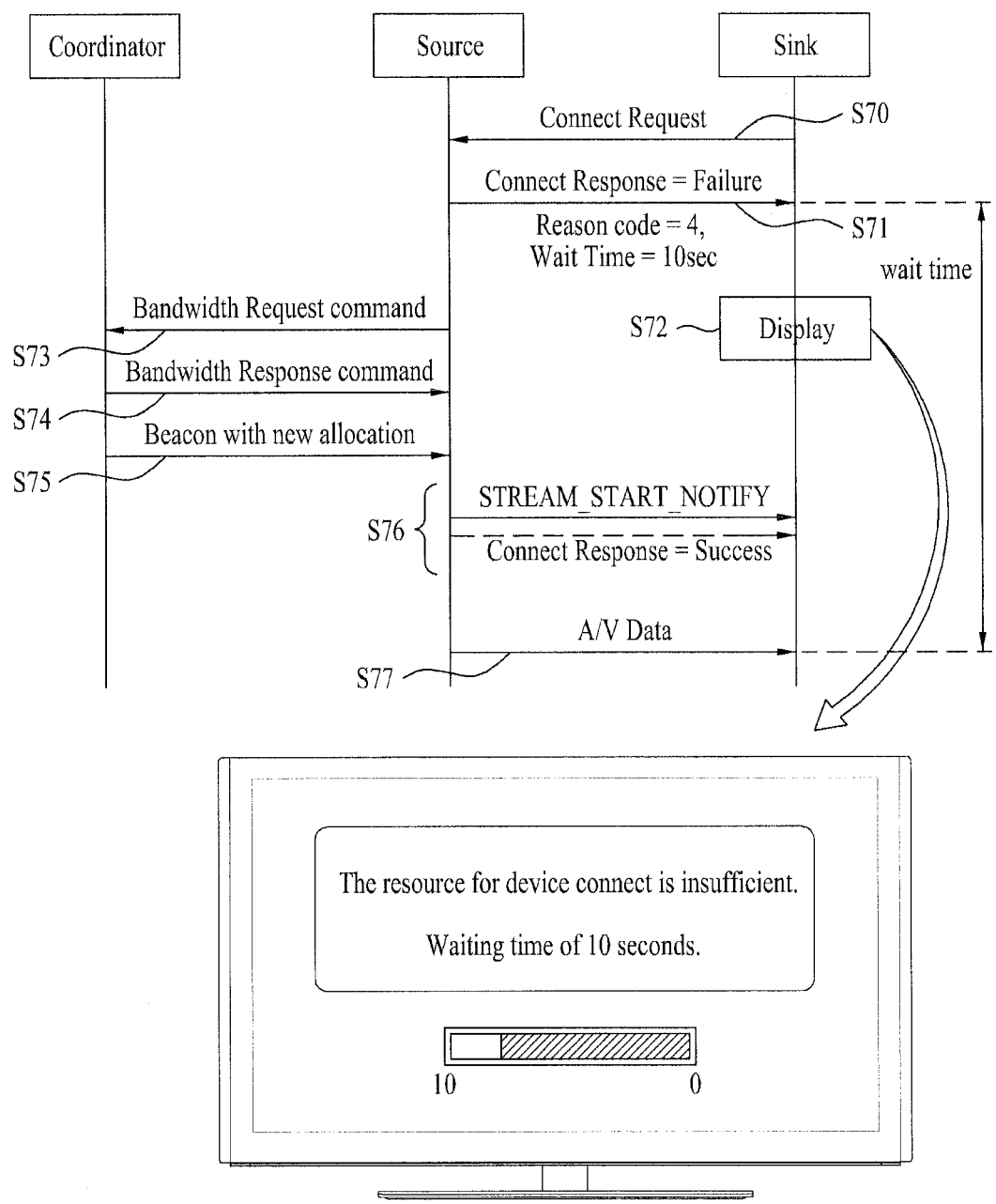
FIG. 19 is a flow chart illustrating another example of a procedure of exchanging messages for request of connection between WVAN devices according to one embodiment of the present invention.

FIG. 19 is a flow chart illustrating another example of a procedure of exchanging messages for request of connection between WVAN devices according to one embodiment of the present invention.

Referring to FIG. 19, when the sink device according to one embodiment of the present invention has transmitted a connect request message to the source device to be connected with itself (S70), the source device may not fail connection due to a shortage of resources. Examples of a shortage of resources associated with streaming connection include a shortage of channel resources required for data transmission from the source device to the sink device and a shortage of transmission power required for data transmission of the source device. In this case, the source device can transmit a connect response message, which includes connection failure indication information, a reason code, and wait time information, to the sink device as shown in FIG. 19 (S71). At this time, the wait time information represents the time required for connection with the sink device if a shortage of resources is solved after the passage of a certain time.

For example, FIG. 19 illustrates that channel resources required for data transmission from the source device to the sink device are not sufficient. The source device sets the reason code to '4' in accordance with code values listed in FIG. 14 and sets the time required for channel resources of a certain amount from the coordinator to the wait time.

The sink device that has received the connect response message outputs one of the failure reason and the wait time information included in the connect response message through the display module provided therein (S72). Since the user of the sink device according to one embodiment of the present invention can check the failure reason and the wait time through the connection failure information output from the display module, the user may not perform reconnection request to the source device for the wait time.

And, the source device transmits a channel resource request message (bandwidth request command) to the coordinator belonging to the wireless network for the wait time (S73). The coordinator that has received the request message searches for available channel resources to be allocated to the source device, and transmits a bandwidth response command, which indicates whether the requested channel resources will be allocated, to the source device (S74). Also, the coordinator transmits information of range or type of the channel resources, which are to be newly allocated, to the source device through a beacon (S75).

Afterwards, the source device includes a stream start notification message (Stream_start_notify) in response to the response to the connection request of the sink device depending on whether the channel resources required for data transmission have been obtained through the step S73 to S76. If the channel resources are allocated to the source device, the source device transmits the stream start notification message to the sink device (S76) and starts A/V data transmission (S77). In this case, the stream start notification message includes the data format as shown in FIG. 12.

Meanwhile, when connection failure occurs due to a shortage of resources other than the channel resources, the source device can retransmit the response message of connection failure to the sink device if the required resources are not allocated within the wait time (S76).

Figure 20:
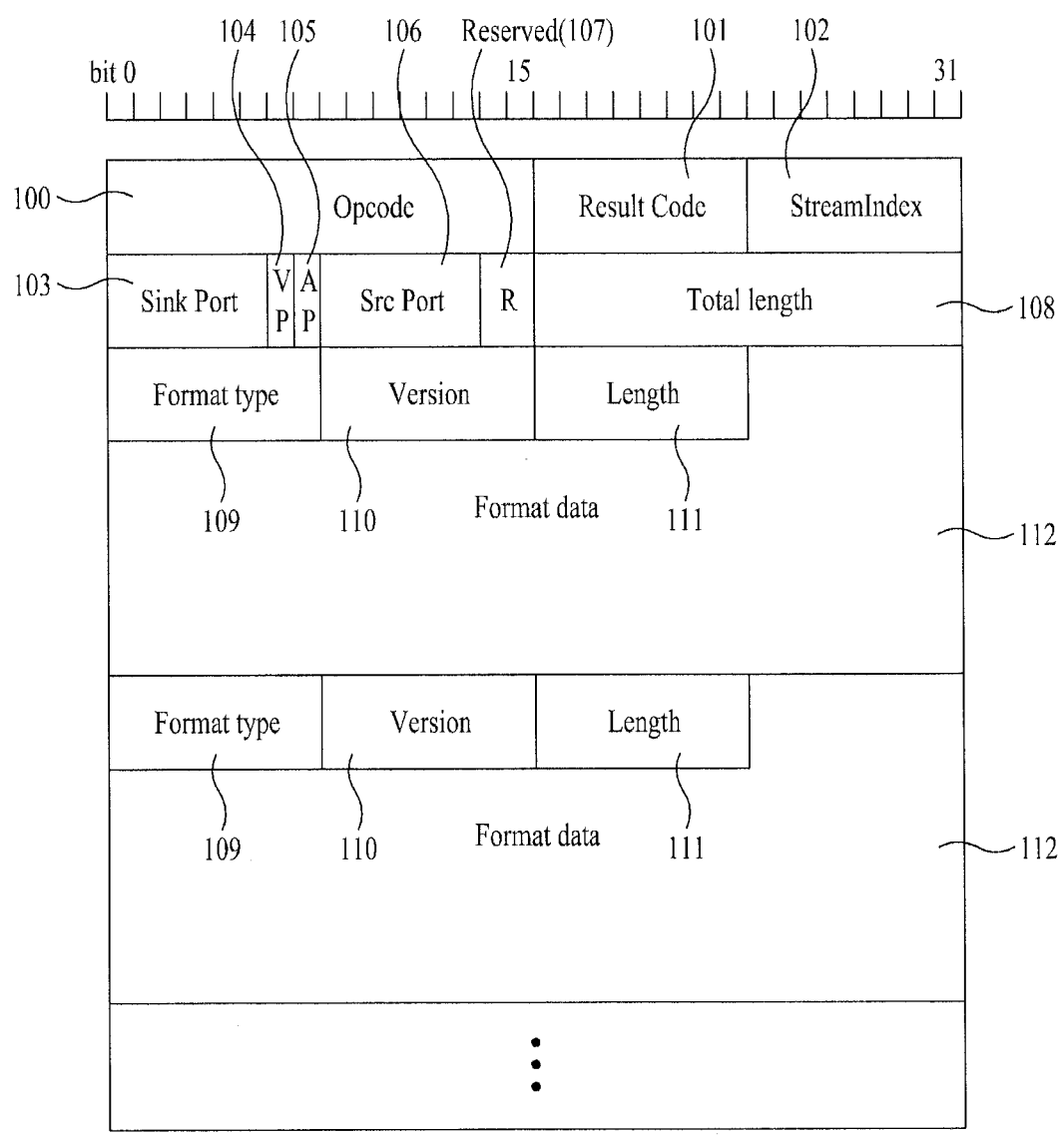
FIG. 20 is a diagram illustrating another example of an AVC message format transmitted and received between WVAN devices according to one embodiment of the present invention.

FIG. 20 is a diagram illustrating another example of an AVC message format transmitted and received between WVAN devices according to one embodiment of the present invention.

In more detail, FIG. 20 illustrates an example of a data field that includes the stream start notification message (Stream_start_notify) transmitted from the source device to the sink device in FIG. 19.

Referring to FIG. 20, the stream start notification message format according to one embodiment of the present invention includes an Opcode field 100 that includes information of action code indicating a function to be performed by the AVC layer, a result code field 101 that includes information of a reason of a response type, a stream index field 102 that includes stream index information, a Sinkport field 103 that includes information of a Sinkport number reserved for A/V data transmission, a video port (VP) field 104 that includes indication information indicating whether a video port for video data transmission is used, an audio port (AP) field 105 that includes indication information indicating whether an audio port for audio data transmission is used, a Srcport field 106 that includes number information of Scrport reserved for A/V data transmission, and a reserved field 107.

The result code field 101, as shown in FIG. 14, includes a result field and a reason field. A bit indicating whether streaming has been started depending on whether channel resources have been allocated from the coordinator is set in the result field. A bit indicating a reason of streaming failure is set in the reason field. Since each reason code has been described in FIG. 14, the same description will be omitted.

The stream index field 102 includes stream index information acquired from the MAC layer during the procedure of allocating channel resources.

In addition, as shown in FIG. 20, the AVC data format of the stream start notification message according to one embodiment of the present invention includes one or more data fields that include a total length field 108 that includes information of a total length of a TLV field, a format type field 109 that includes information of a format data type, a version field 110 that includes information indicating a version number of the format data field 112, a length field 111 that includes length information of the format data field 112, and the format data field 112 that includes format data.

In the step S76 of FIG. 19, the connect response message transmitted from the source device to the sink device is transmitted as the connect response message format shown in FIG. 13.

Figure 21:
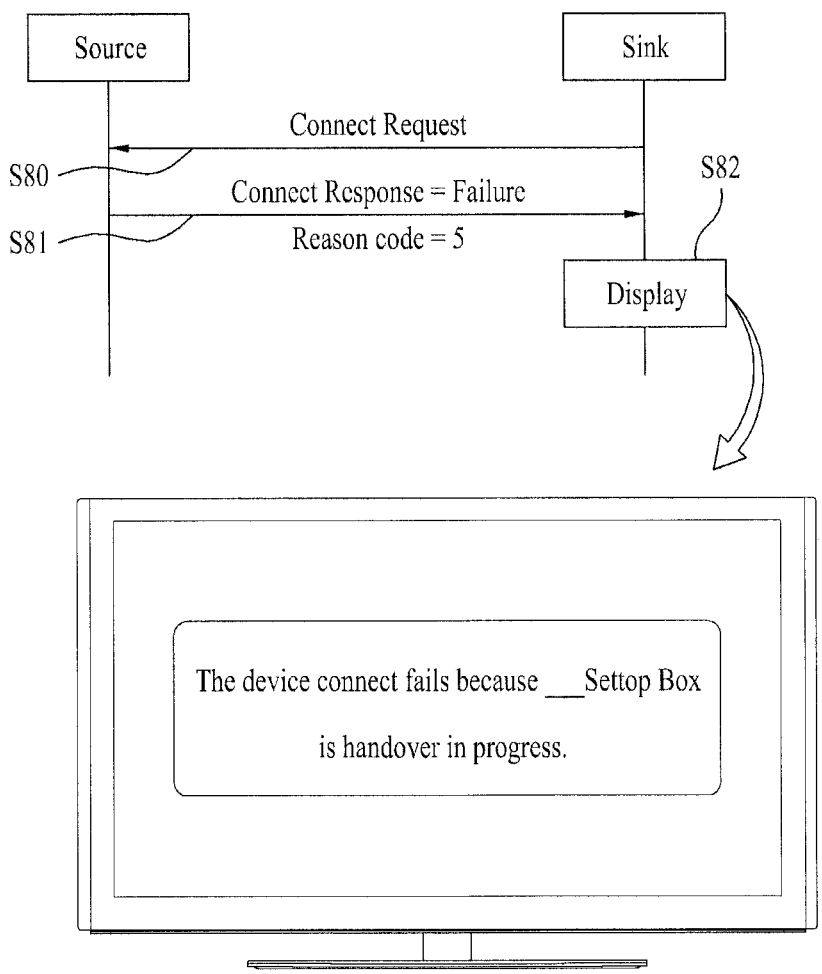
FIG. 21 is a flow chart illustrating another example of a procedure of exchanging messages for request of connection between WVAN devices according to one embodiment of the present invention.

FIG. 21 is a flow chart illustrating another example of a procedure of exchanging messages for request of connection between WVAN devices according to one embodiment of the present invention.

Referring to FIG. 21, when the sink device according to one embodiment of the present invention has transmitted a connect request message to the source device to be connected with itself (S80), since the source device belonging to the same network as that of the sink device is being changed to another network, it may not perform streaming connection. In this case, the source device can transmit a connect response message, which includes connection failure indication information due to network change and a reason code, to the sink device as shown in FIG. (S81). The reason code can be set to '5' in accordance with the code values listed in FIG. 14. The sink device that has received the connect response message outputs identification information of the corresponding source device and the connection request result such as 'network changing' on the display module provided therein (S82).

Figure 22:
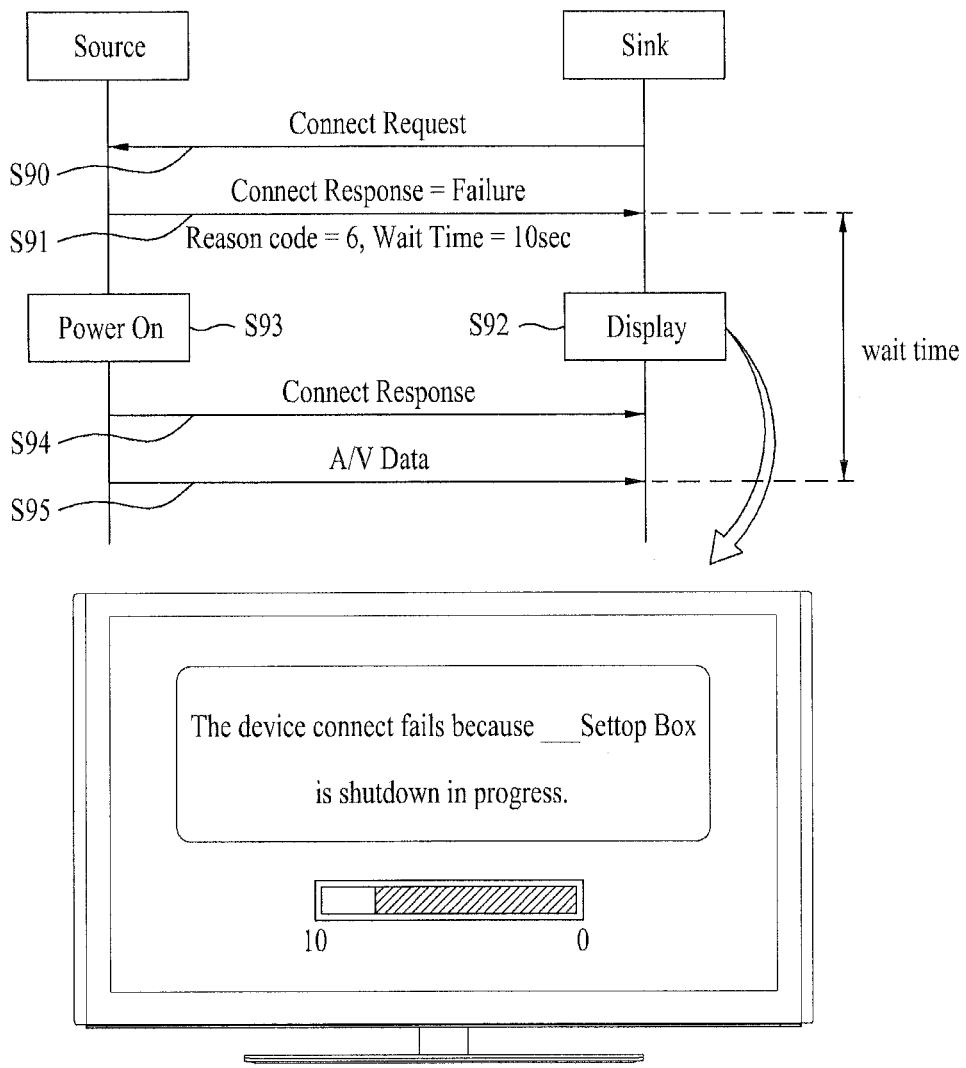
FIG. 22 is a flow chart illustrating another example of a procedure of exchanging messages for request of connection between WVAN devices according to one embodiment of the present invention.

FIG. 22 is a flow chart illustrating another example of a procedure of exchanging messages for request of connection between WVAN devices according to one embodiment of the present invention.

Referring to FIG. 22, when the sink device according to one embodiment of the present invention has transmitted a connect request message to the source device to be connected with itself (S90), since the source device is in system power-off status, it may not perform streaming connection. In this case, the source device can transmit a connect response message, which includes connection failure indication information due to system power-off, a reason code, and wait time information, to the sink device as shown in FIG. (S91). The reason code can be set to '6' in accordance with the code values listed in FIG. 14. The source device can set the wait time to the time required for switching from the system power-off status to the system power-on status in accordance with the connection request of the sink device. The sink device that has received the connect response message outputs the connection request result such as identification information of the corresponding source device, the reason of connection failure, and the wait time information on the display module provided therein (S92).

The source device switches the power on/off status of the source device within the wait time (S93), and retransmits the connect response message, which indicates whether connection with the sink device has been performed, to the sink device (S94). At this time, the sink device that has received the connect response message outputs connection information indicating that connection with the source device has been performed on the display module. The source device connected with the sink device can transmit A/V data immediately after transmitting the connection success response message to the sink device, and can perform A/V data transmission without transmission of the connection success response message (S95).

Figure 23:
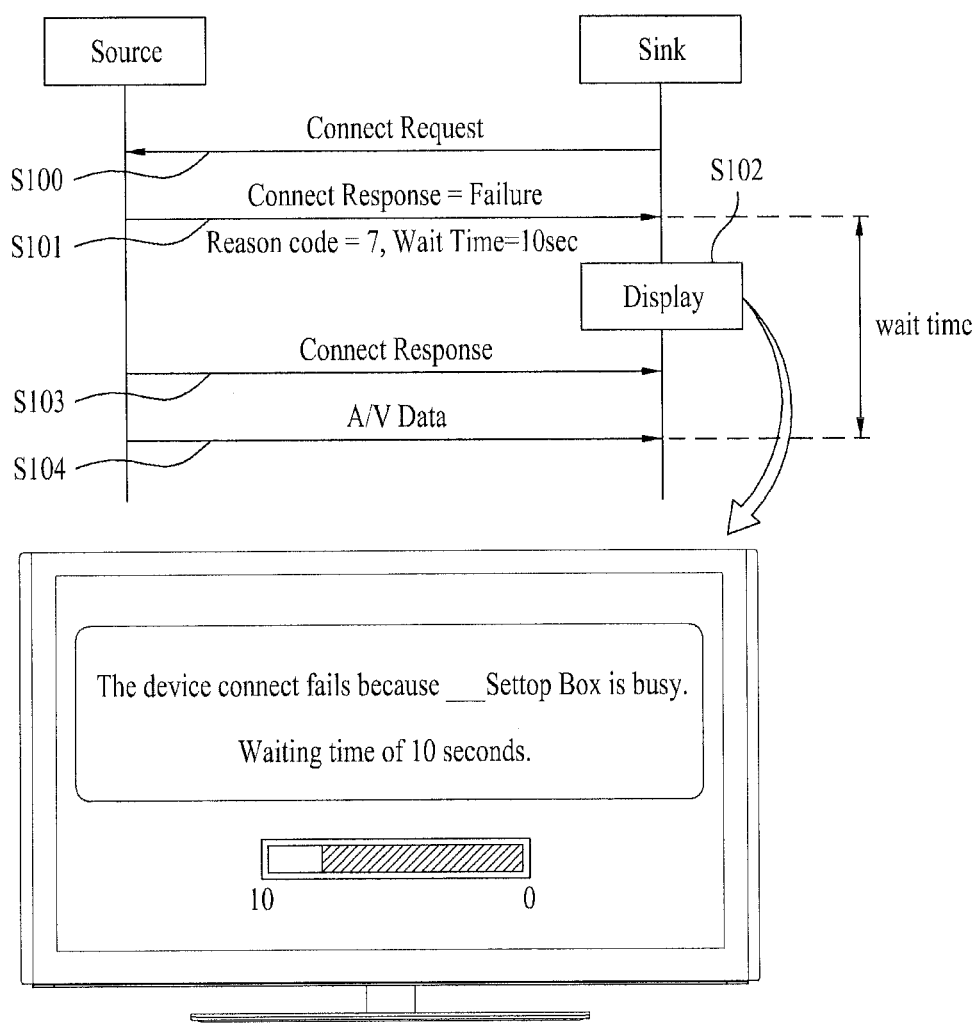
FIG. 23 is a flow chart illustrating another example of a procedure of exchanging messages for request of connection between WVAN devices according to one embodiment of the present invention.

FIG. 23 is a flow chart illustrating another example of a procedure of exchanging messages for request of connection between WVAN devices according to one embodiment of the present invention.

Referring to FIG. 23, when the sink device according to one embodiment of the present invention has transmitted a connect request message to the source device to be connected with itself (S100), since the source device is performing another function, it may not perform streaming connection with the sink device. In this case, the source device can transmit a connect response message, which includes connection failure indication information due to another function performed by the source device, a reason code, and wait time information, to the sink device as shown in FIG. 23 (S101). The reason code can be set to in accordance with the code values listed in FIG. 14. The source device can set the wait time to the time required until the source device connected with the sink device performs streaming start after ending the function currently in service in accordance with the connection request of the sink device. The sink device that has received the connect response message outputs the connection request result such as identification information of the corresponding source device, the reason of connection failure, and the wait time information on the display module provided therein (S102).

Afterwards, the source device performs operation switching from the current operation to the connection status with the sink device, and retransmits the connect response message, which includes information indicating connection success or failure, to the sink device (S103). If the source device is connected with the sink device, it transmits A/V data without retransmission of the connect response message in previous step (S104).

Figure 24:
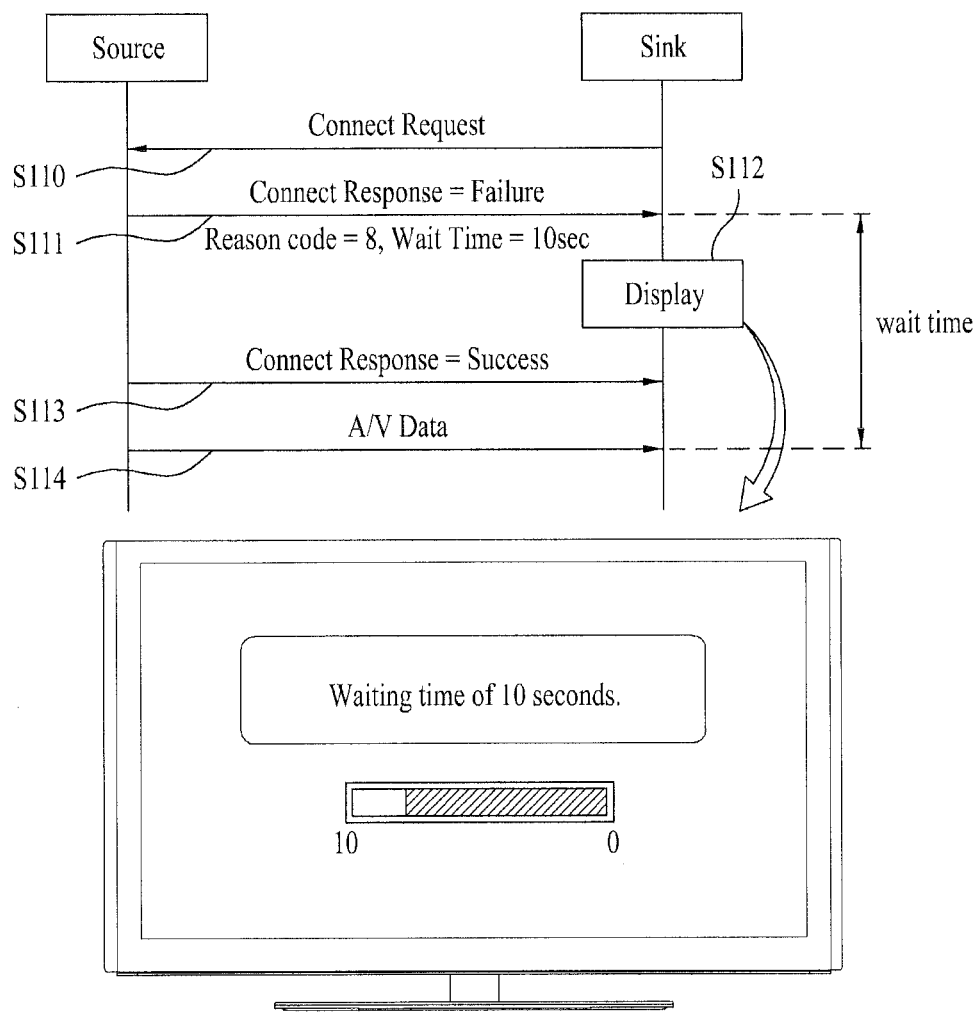
FIG. 24 is a flow chart illustrating another example of a procedure of exchanging messages for request of connection between WVAN devices according to one embodiment of the present invention.

FIG. 24 is a flow chart illustrating another example of a procedure of exchanging messages for request of connection between WVAN devices according to one embodiment of the present invention.

Referring to FIG. 24, when the sink device according to one embodiment of the present invention has transmitted a connect request message to the source device to be connected with itself (S110), since the source device performs connection operation between devices due to another reason other than the aforementioned reasons, a certain time may be delayed. In this case, since the source device cannot perform connection operation immediately after receiving the request message, it transmits a response message of connection failure to the sink device. In other words, the source device can transmit a connect response message, which includes connection failure indication information, a reason code, and wait time information, to the sink device as shown in FIG. 24 (S111). The reason code can be set to '8' in accordance with the code values listed in FIG. 14. The wait time can be set to the time delayed until the source device is connected with the sink device. The sink device that has received the connect response message outputs the connection request result such as identification information of the corresponding source device, the reason of connection failure, and the wait time information on the display module provided therein (S112).

Afterwards, the source device can retransmit the connect response message, which includes information indicating success or failure of connection with the sink device, to the sink device when the wait time passes (S113). If the source device can perform connection operation with the sink device even within the set wait time, it can transmit a response message of connection success to the sink device. If the source device is connected with the sink device, it transmits A/V data without retransmission of the connect response message in previous step (S114).

The embodiments described in FIG. 14 to FIG. 24 are intended to describe an example of the response message that can be transmitted from the source device in accordance with connection request of the sink device. In this case, the source device can transmit a response message, which includes wait time information, to the sink device in a type different from that shown in each of FIG. 14 to FIG. 24.

Figure 25:
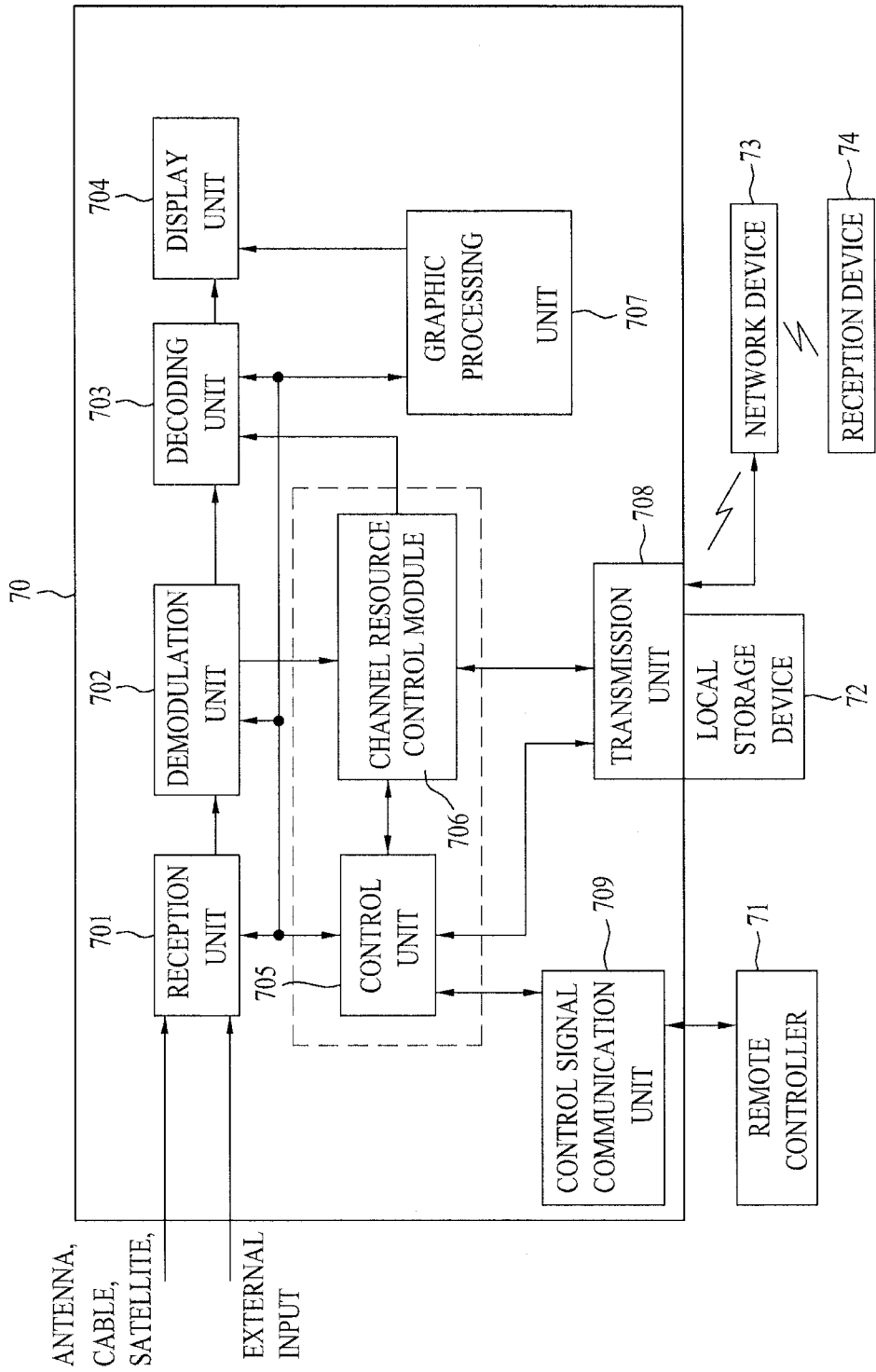
FIG. 25 is a diagram illustrating an example of a broadcasting signal transmission system that includes a WVAN device according to another embodiment of the present invention.

FIG. 25 is a diagram illustrating an example of a broadcasting signal transmission system that includes a WVAN device according to another embodiment of the present invention.

Generally, the WVAN device can play A/V data through processes which will be described layer, wherein the A/V data are input from at least one of a broadcasting station, cable, satellite, and other WVAN device through an antenna. If the WVAN device receives data from other device, it may be a sink device. If the WVAN device transmits data to other device, it may be a source device. Also, the WVAN device may perform message exchange with the coordinator.

Referring to FIG. 25, the broadcasting signal processing system according to the embodiment of the present invention includes a WVAN source device 120, a user input module 130, a local memory device 140, and a network device 180 for performing wireless communication with other device 160.

The source device 120 includes a receiving module 121 that receives a signal from the outside, a demodulation module 122, a decoding module 123, a display module 124, a control module 125, a graphic processor 127, an interface module 128, and a control signal communication module 129. In FIG. 14, the local memory device 140 is directly connected with the interface module 128 that includes input and output ports. However, the local memory device 140 may be a memory device mounted in the source device 120.

The interface module 128 can communicate with a wire/wireless network device 150, and can be connected with at least one other device 160 through the network device 150, wherein the at least one other device 160 exists on the wireless network. The control signal communication module 129 receives a user control signal in accordance with a user control device, for example, a remote controller, and outputs the received signal to the control module 125.

The receiving module 121 could be a tuner that receives a broadcasting signal of a specific frequency through at least one of ground wave, satellite, cable, and Internet network. The receiving module 121 may be provided respectively for each of broadcasting sources, for example, ground wave broadcasting, cable broadcasting, satellite broadcasting, and personal broadcasting. Alternatively, the receiving module 121 may be a unified tuner. Also, supposing that the receiving module 121 is a tuner for ground wave broadcasting, at least one digital tuner and at least one analog tuner may be provided respectively, or a digital/analog tuner may be provided.

Furthermore, the receiving module 121 may receive internet protocol (IP) streams transferred through wire and wireless communication. If the receiving module 121 receives IP streams, the receiving module 121 can process transmitting and receiving packets in accordance with an IP protocol that establishes source and destination information for received IP packets and packets transmitted from the receiver. The receiving module 121 can output video/audio/data streams included in the received IP packets in accordance with the IP protocol, and can generate transport streams to be transmitted to the network as IP packets in accordance with the IP protocol so as to output them. The receiving module 121 is an element that receives an externally input video signal, and, for example, may receive IEEE 1394 type video/audio signals or HDMI type streams from the outside.

The demodulation module 122 demodulates broadcasting signals among data input through the receiving module 121 or broadcasting signals transmitted from the receiving device in an inverse order of a modulation mode. The demodulation module 122 outputs broadcasting streams by demodulating the broadcasting signals. If the receiving module 121 receives stream type signals, for example, IP streams, the IP streams are output to the decoding module 123 after bypassing the demodulation module 122.

The decoding module 123 includes an audio decoder and a video decoder, and decodes the broadcasting streams output from the demodulation module 122 through a decoding algorithm and outputs the decoded streams to the display module 124. At this time, a demultiplexer (not shown) that splits each stream in accordance with a corresponding identifier may additionally be provided between the demodulation module 122 and the decoding module 123. The demultiplexer splits the broadcasting signals into an audio element stream (ES) and a video element stream and outputs them to each decoder of the decoding module 123. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 124 displays broadcasting contents received from the receiving module 121 and contents stored in the local memory device 140. The display module 124 can display a menu indicating whether the memory device has been mounted in the transmitting device and information related to the remaining capacity of the memory device, in accordance with a control command of the control module 125, and can be operated under the control of the user.

The control module 125 can control the operations of the aforementioned modules (receiving module, demodulation module, decoding module, display module, graphic processor, spatial multiplexing precoder and beamforming module, and interface module). Also, the control module 125 displays a menu that receives a control command of the user, and drives an application that displays various kinds of information or menu of the broadcasting signal processing system for the user.

For example, the control module 125 can read out the contents stored in the local memory device 1470 if the local memory device 140 is mounted in the transmitting device. Also, the control module 125 can control the operation of the local memory device 140 so that the broadcasting contents received from the receiving module 121 are stored in the local memory device 140 if the local memory device 140 is mounted in the transmitting device. Furthermore, the control module 125 can output a control signal for mounting the local memory device 140 depending on whether the local memory device 140 has been mounted in the source device.

The control module 125 checks remaining memory capacity of the local memory device 140, and allows information of the remaining memory capacity to be displayed for the user on the display module 124 through the graphic processor 127. The control module 125 can shift the contents stored in the local memory device 140 to the remote memory device if the remaining memory capacity of the local memory device 140 is not sufficient. In this case, the control module 125 can display a menu indicating whether to shift the contents stored in the local memory device 140 to another local memory device (not shown) or the remote memory device through the display module 124. And, the control module 125 can receive and process a user control signal of the menu. Accordingly, the control module 125 can allow the contents stored in the local memory device 140 and other directly or remotely mounted memory device to be shifted between them and stored therein.

If the source device 120 shown in FIG. 25 transmits broadcasting signals received from the receiving module 121 to other device on the WHDI network, the network control module 126 transmits the broadcasting signals together with MAC message or AVC message, or generates an independent message to transmit the generated message. The network control module 126 may directly receive the broadcasting signals from the receiving module 121, or may receive the broadcasting signals demodulated by the demodulation module 122. In case of the former case, an encoding process may be omitted. Also, the broadcasting signals received by the receiving module 121 can be input to the network control module 126 after going through a processing procedure for signal transmission in the control module 125. For example, if a message including the broadcasting signals is received from the external device 160, the received message is split into a broadcasting signal and MAC message by the network control module 125. The split broadcasting signal (or broadcasting stream) is input to the decoding module 123, decoded by a decoding algorithm, and output to the display module 124.

The network control module 126 can control an AVC layer generating a predetermined AVC message, a MAC layer generating a MAC message that includes the AVC message transferred from the AVC layer or includes an independent MAC command, and a PHY layer for transmitting the above messages to the external device. According to the embodiment of the present invention, if the AVC message of connection request is transmitted from the sink device, the network control module 126 performs connection operation between devices. As a result, the network control module 126 generates a response message of connection success or failure and transmits the generated response message to the sink device through the transmitting module. Also, the network control module determines a certain time delayed until connection with the sink device is performed, so that the delayed time is included in the response message.

If the connection with the sink device cannot be performed due to the device status such as system power-off of the source device or execution of other function, the network control module 126 can transmit a control signal to the control module 125, so that the control module 125 performs system start or operation status change. If streaming connection with the sink device can be performed in accordance with the control operation of the control module 125, the network control module 126 can generate the connect response message and transmit the generated message.

The function that can be performed by the source device is performed through the control module 125 or the network control module 126. On the other hand, if operation is determined in accordance with a decision decided by the user of the source device, an input signal should be applied through the user input module 130. The user input module 130 includes an input module provided in the device and a remote controller that can apply an input signal externally. For example, if the source device performs other function when the connect request message is transmitted from the sink device, the source device can determine whether the user will perform the request for the sink device. In this case, the input signal for changing the operation status of the source device can be applied through the user input module 130.

The control module 125 or the network control module 126 can perform a specific function in accordance with an operation signal of a specific function input through the user input module 130.

Although the control module 125 and the network control module 126 are provided respectively in FIG. 25 for convenience of description, they may be implemented by a single system chip as shown in a portion marked with a dotted line.

The graphic processor 127 processes a graphic to be displayed so that a menu screen is displayed in a video image displayed by the display module 124, and controls the graphic to be displayed in the display module 124 together with the menu screen.

The interface module 128 can be used to transmit the data packet generated by the control module 125 or the network control module 126 to other device 160 through the wire and wireless network.

Also, the interface module 128 can perform bidirectional communication between the devices belonging to the WVAN. Examples of the interface module include Ethernet module, Bluetooth module, short distance wireless Internet module, portable Internet module, home PNA module, IEEE1394 module, PLC module, home RF module, and IrDA module.

In the broadcasting signal system that includes a WVAN device shown in FIG. 25, the device 120 could be a source device that transmits data, a sink device that receives data from the source device, or a coordinator.

If the device 120 shown in FIG. 20 is a sink device according to one embodiment of the present invention and transmits the connect request message to the source device, the network control module 126 can generate AVC connect request message and transmit the generated message to the source device through the transmitting module. Also, if the connect response message is received through the receiving module 121, the network control module 126 can draw indication information indicating connection success or failure, indication information indicating a failure reason, and wait time information from the response message and output at least one of them through the display module 124.

Also, the network control module 126 can decide to attempt streaming connection with the sink device based on the response message of the source device and manage retransmission or not of the connect request message.

The connection management between two or more devices belonging to the aforementioned WVAN network can be performed by the network control module 126 or the control module 125, as described above.

The terms herein can be replaced with other terms. For example, "device" can be replaced with user device (or machine), station, etc., and "coordinator" can be replaced with coordinating (control) device, coordinating (or control) station, piconet coordinator (PNC), etc. Also, the WVAN parameter configuring the WVAN can be used to refer to network configuration information.

It will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of exchanging messages in a sink device of a wireless network, the messages being intended for streaming connection with a source device, the method comprising:
    transmitting a connect request message for data streaming to the source device;
    receiving a connect response message from the source device, the connect response message including connection information indicating that connection with the source device has failed; and
    outputting a user interface, on a display module, indicating both the connection information included in the connect response message and wait time information that indicates a wait time for the sink device to wait to make a connection with the source device.

2. The method of claim 1, wherein the user interface is output from a display window indicating any one of 'connection request rejected', 'connection timeout', 'failure due to absence of module', 'connection failure due to invalid command', 'connection delay due to insufficient resources', 'connection failure due to network handover in progress', 'connection delay due to power status change of module', 'connection delay due to use of module', and 'just connection delay' in accordance with the connection information.

3. The method of claim 2, wherein when the user interface outputs any one of 'connection delay due to insufficient resources', 'connection delay due to power status change of module', and 'just connection delay', the user interface further outputs the wait time information required for reconnection with the source device.

4. The method of claim 1, wherein the wait time included in the wait time information passes immediately after the connect response message is transmitted.

5. The method of claim 1, further comprising receiving a reconnect response message that includes connection information indicating a possibility of connection with the source device.

6. The method of claim 5, wherein when the reconnect response message includes connection information indicating that connection with the source device has been successfully performed, the method further comprises receiving A/V data from the source device.

7. The method of claim 1, wherein when the connect response message includes connection information indicating that connection with the source device has failed due to insufficient channel resources in the source device, the method further comprises receiving a stream start notification (Stream_start_notify) message that includes information indicating whether data streaming has started.

8. A sink device of a wireless network comprising:
a transmitting module to transmit a connect request message for data streaming to a source device;
a receiving module to receive a connect response message from the source device, the connect response message including connection information indicating that connection with the source device has failed; and
a display module to output a user interface indicating both the connection information included in the connect response message and wait time information that indicates a wait time for the sink device to wait to make a connection with the source device.

9. The sink device of claim 8, wherein the user interface is output from a display window indicating any one of 'connection request rejected', 'connection timeout', 'failure due to absence of module', 'connection failure due to invalid command', 'connection delay due to insufficient resources', 'connection failure due to network change', 'connection delay due to power status change of module', 'connection delay due to use of module', and 'just connection delay' in accordance with the connection information.

10. The sink device of claim 9, wherein, when the user interface outputs any one of 'connection delay due to insufficient resources', 'connection delay due to power status change of module', and 'just connection delay', the user interface further outputs the wait time information required for reconnection with the source device.

11. The sink device of claim 8, wherein the wait time included in the wait time information passes immediately after the transmitting module transmits the connect response message.

12. The sink device of claim 8, wherein the receiving module receives a reconnect response message that includes connection information indicating a possibility of connection with the source device.

13. The sink device of claim 8, wherein, when the reconnect response message includes connection information indicating that connection with the source device has been successfully performed, the receiving device receives A/V data from the source device.

\* \* \* \* \*